May 9, 1939.   C. G. LAMICA   2,157,266
COMBINATION AMUSEMENT AND ADVERTISING DEVICE
Filed June 16, 1937   14 Sheets-Sheet 1

Clement G. Lamica.
INVENTOR
BY Victor J. Evans & Co.
ATTORNEYS

May 9, 1939.   C. G. LAMICA   2,157,266
COMBINATION AMUSEMENT AND ADVERTISING DEVICE
Filed June 16, 1937   14 Sheets-Sheet 2

Clement G. Lamica.
INVENTOR
BY Victor J. Evans & Co.
ATTORNEYS

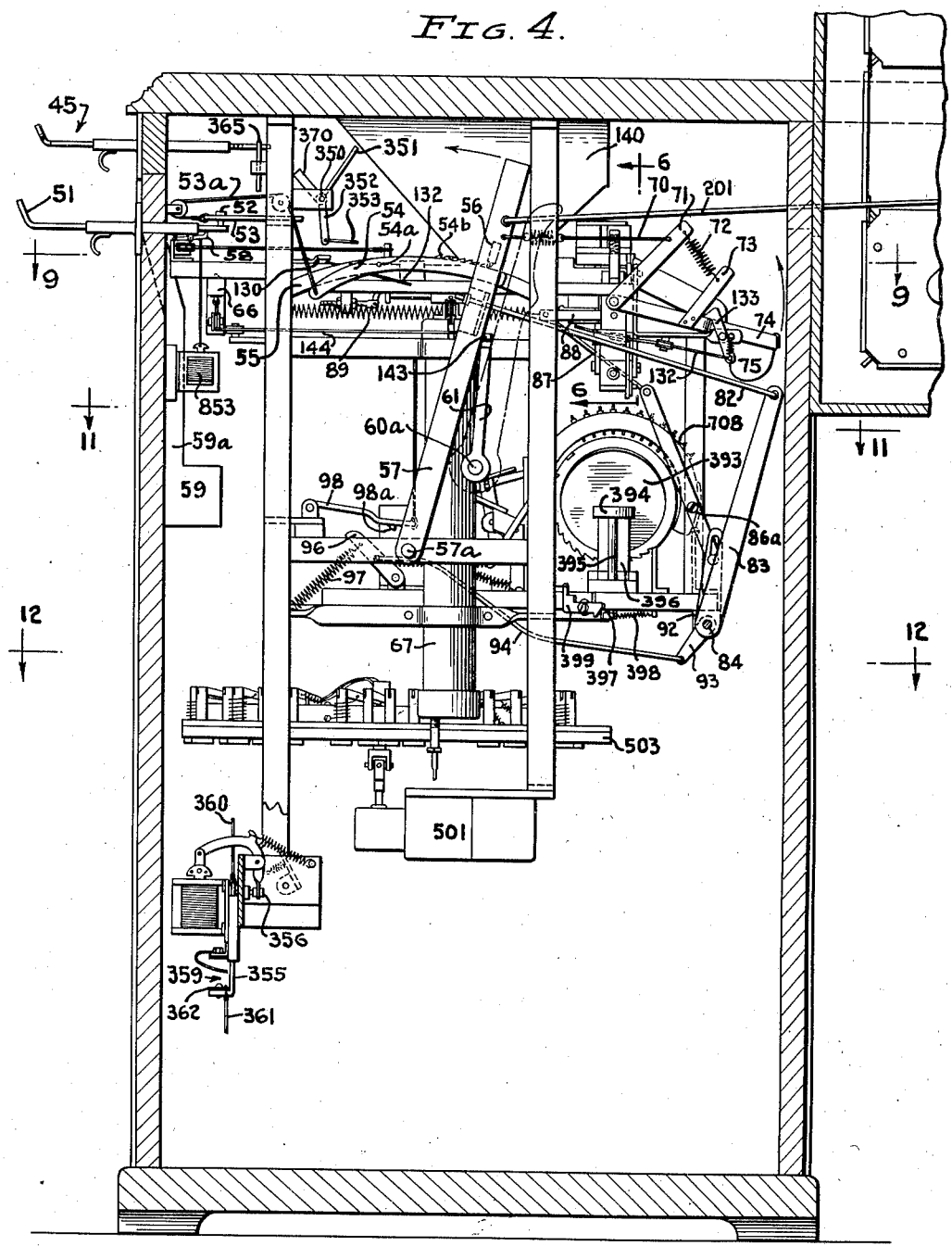

May 9, 1939.  C. G. LAMICA  2,157,266
COMBINATION AMUSEMENT AND ADVERTISING DEVICE
Filed June 16, 1937   14 Sheets-Sheet 4

Clement G. Lamica.
INVENTOR
BY Victor J. Evans & Co.
ATTORNEYS

May 9, 1939.  C. G. LAMICA  2,157,266
COMBINATION AMUSEMENT AND ADVERTISING DEVICE
Filed June 16, 1937    14 Sheets-Sheet 5

Clement G. Lamica,
INVENTOR
BY Victor J. Evans & Co.
ATTORNEYS

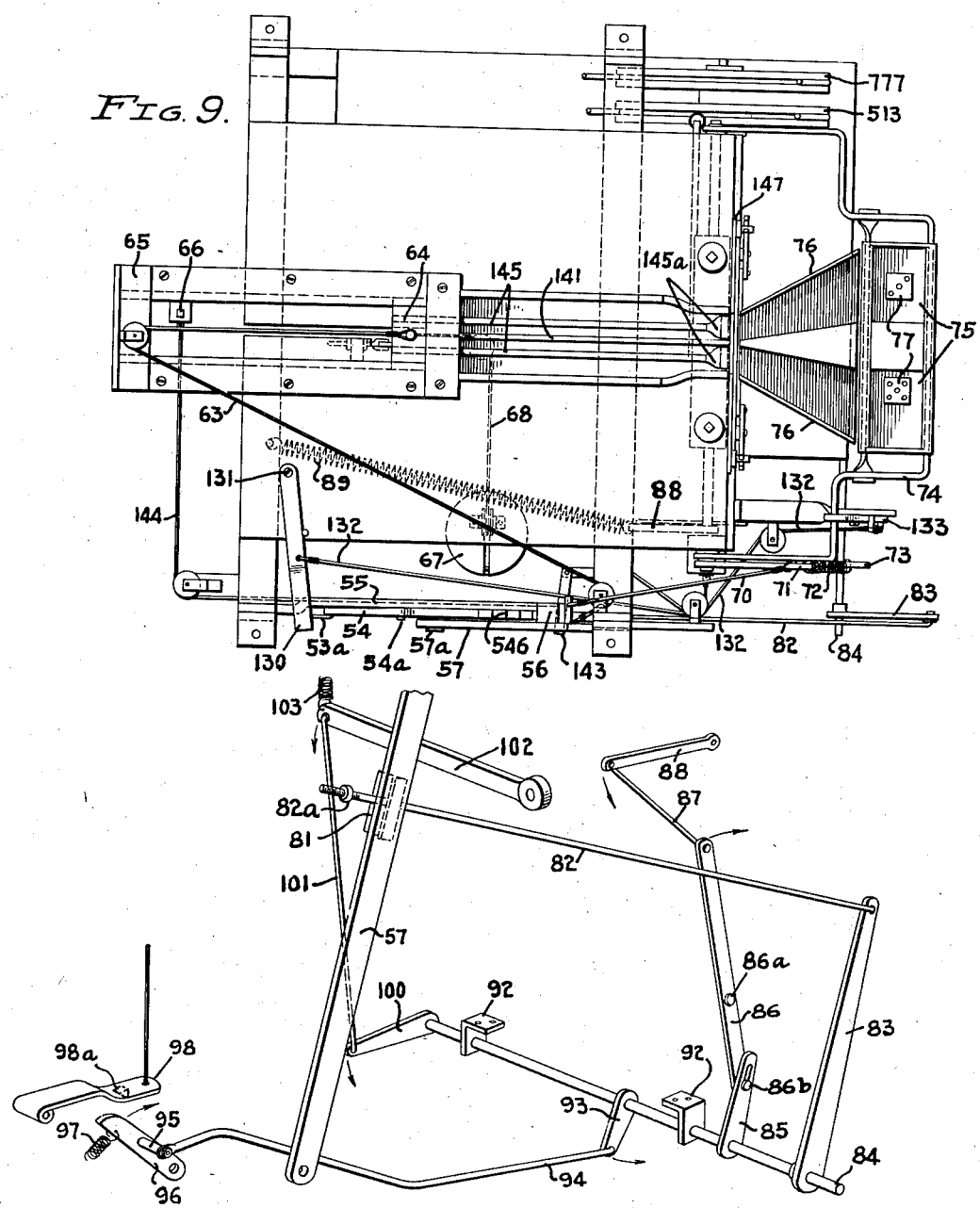

May 9, 1939.  C. G. LAMICA  2,157,266
COMBINATION AMUSEMENT AND ADVERTISING DEVICE
Filed June 16, 1937   14 Sheets-Sheet 8
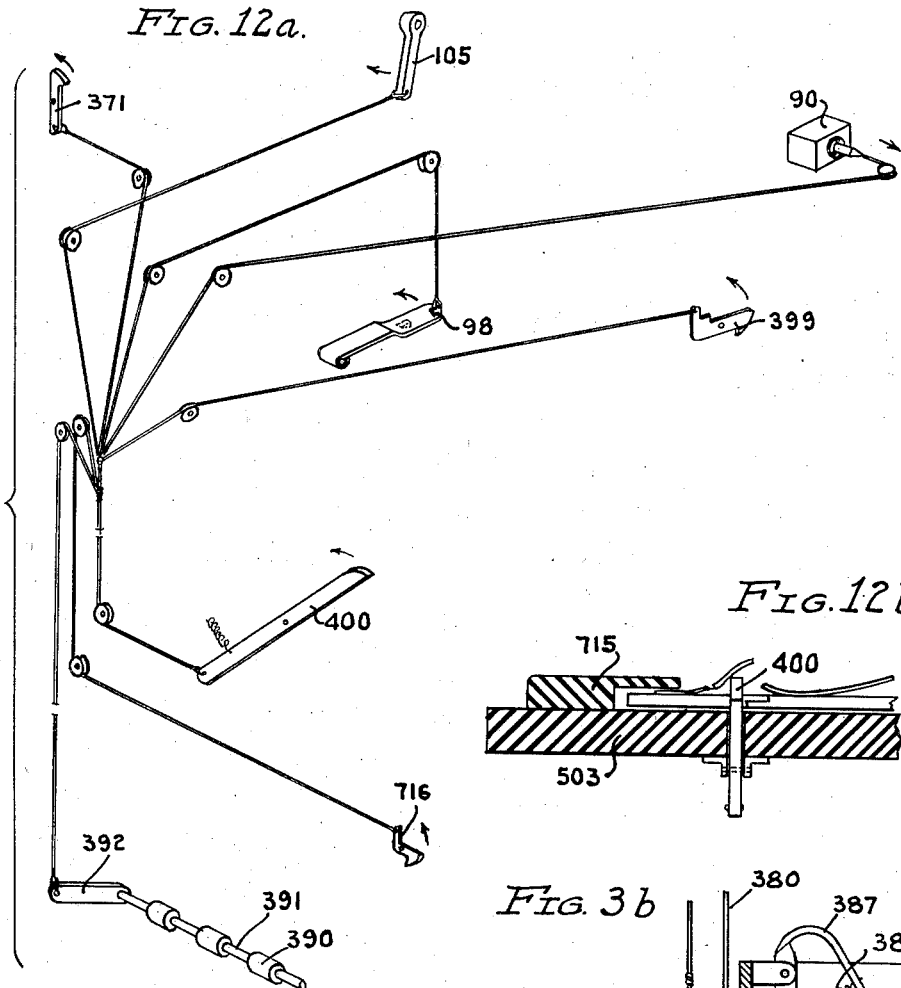
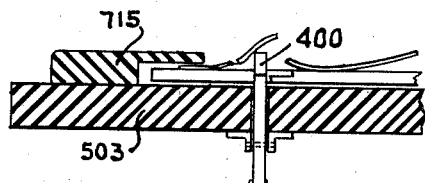
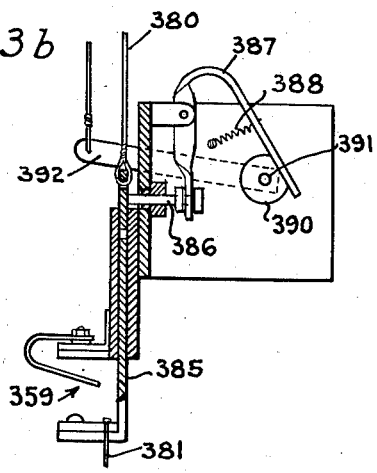
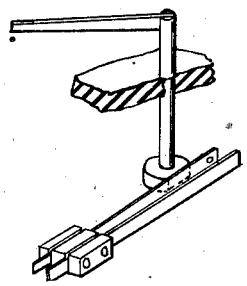
Clement G. Lamica
INVENTOR
BY Victor J. Evans & Co.
ATTORNEYS May 9, 1939.  C. G. LAMICA  2,157,266
COMBINATION AMUSEMENT AND ADVERTISING DEVICE
Filed June 16, 1937   14 Sheets-Sheet 9

Clement G. Lamica.
INVENTOR
BY Victor J. Evans & Co.
ATTORNEYS

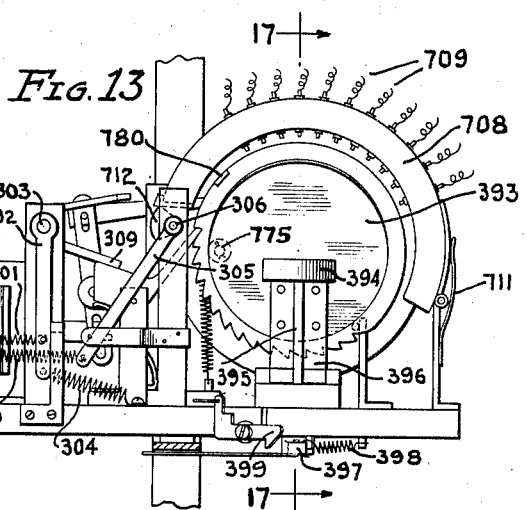
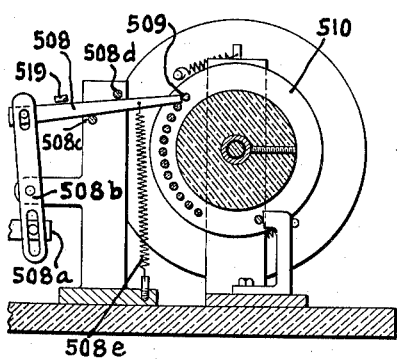
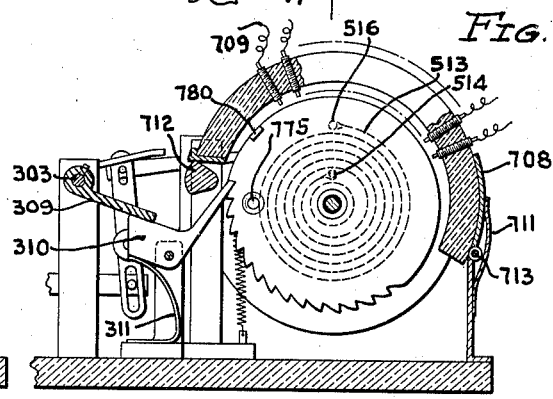
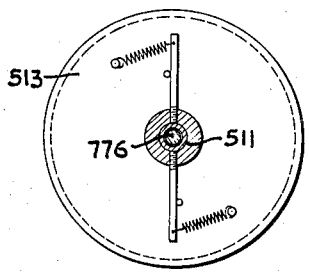
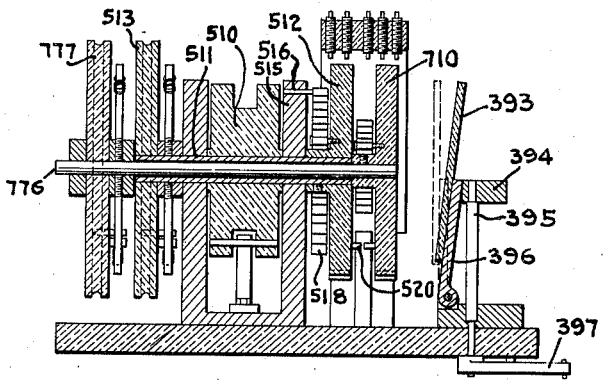
Clement G. Lamica, INVENTOR

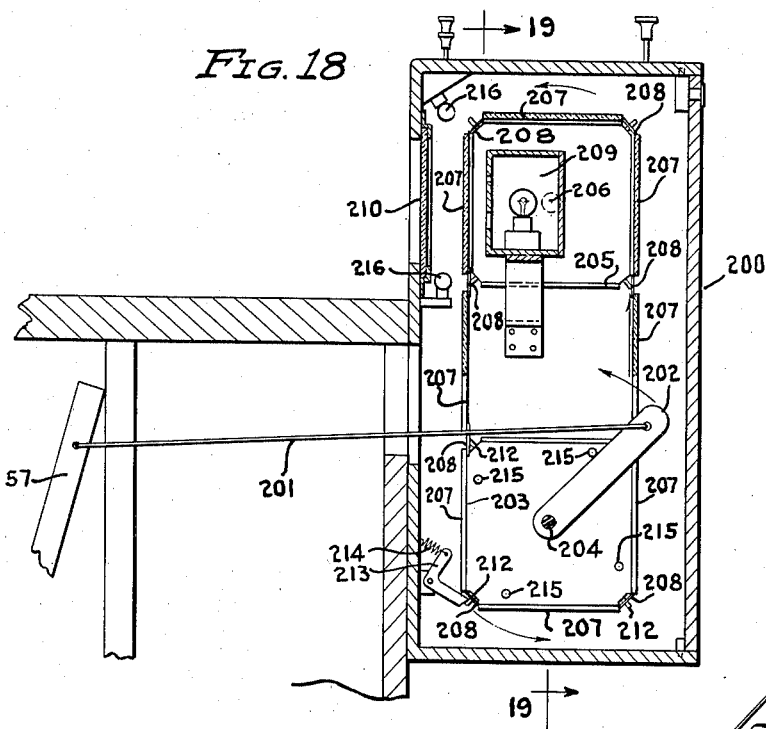
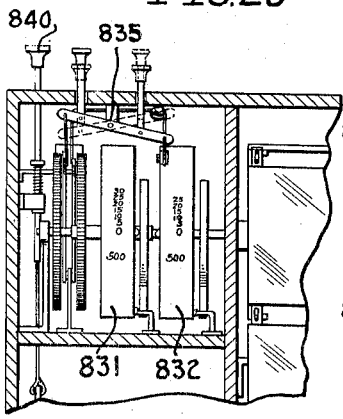
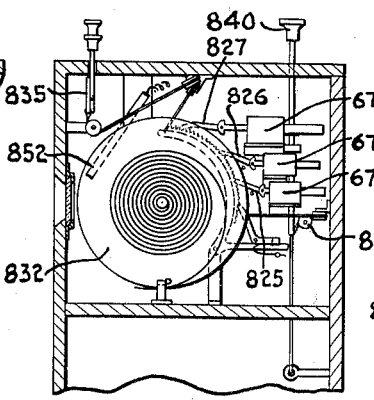
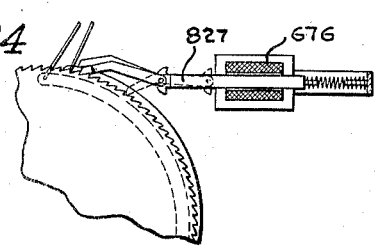

May 9, 1939.  C. G. LAMICA  2,157,266
COMBINATION AMUSEMENT AND ADVERTISING DEVICE
Filed June 16, 1937  14 Sheets-Sheet 12

Clement G. Lamica
INVENTOR
BY Victor J. Evans & Co.
ATTORNEYS

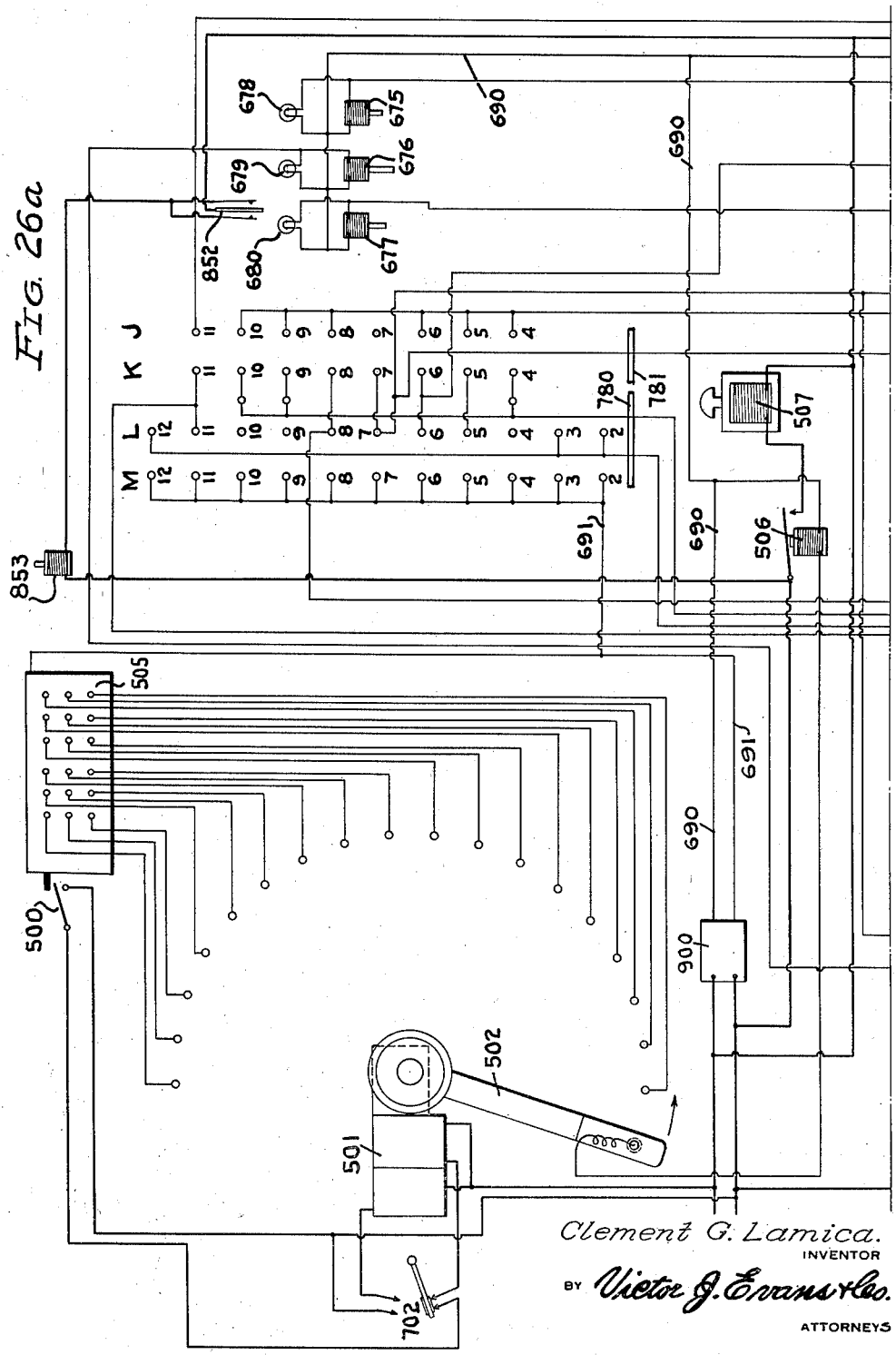

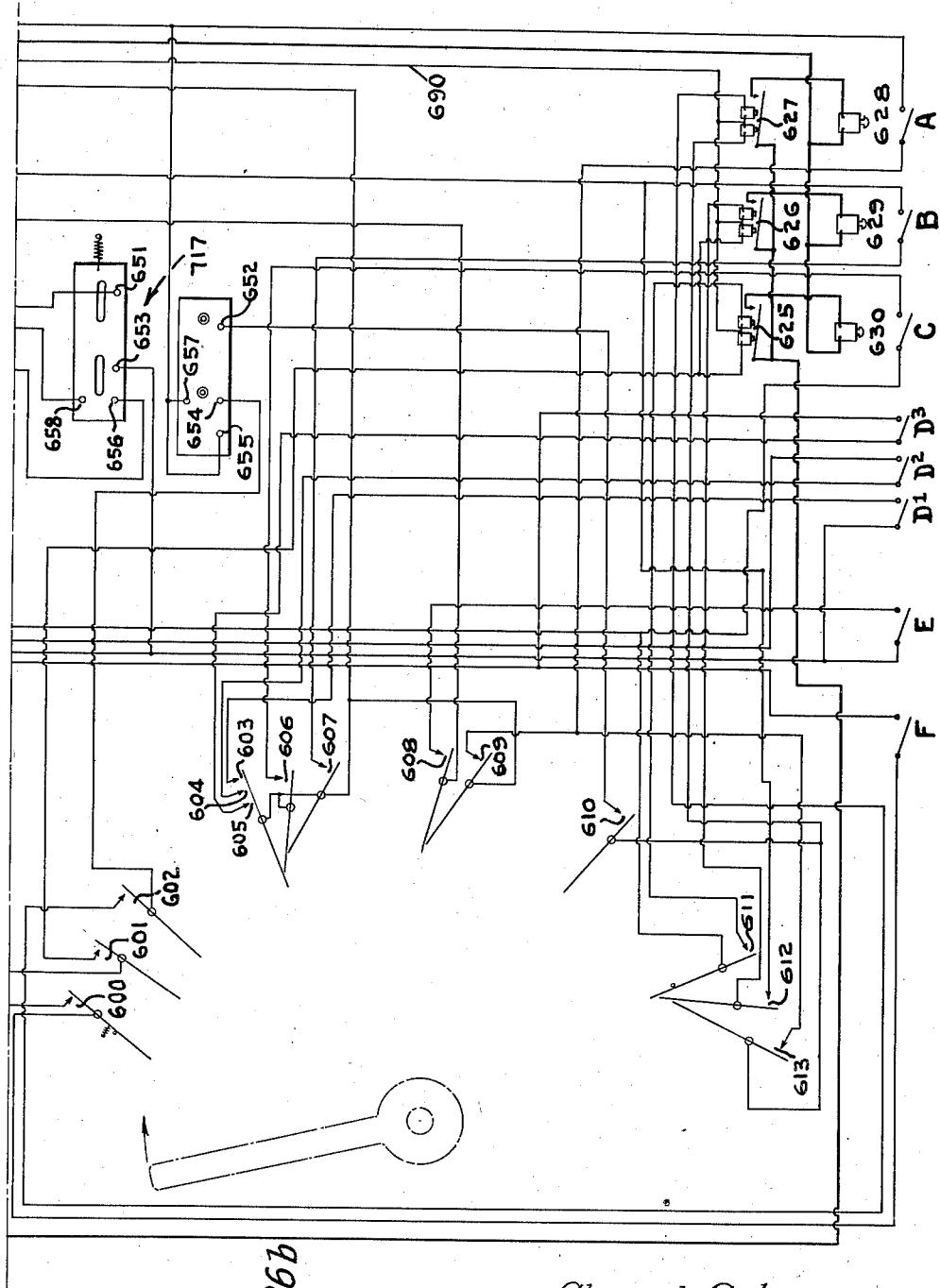

Patented May 9, 1939

2,157,266

UNITED STATES PATENT OFFICE 2,157,266

COMBINATION AMUSEMENT AND ADVERTISING DEVICE

Clement G. Lamica, Newark, N. J., assignor to Harrington E. Drake, Newark, N. J.

Application June 16, 1937, Serial No. 148,604

22 Claims. (Cl. 273—145)

This invention relates to amusement devices and more particularly to amusement devices which function in cooperative relationship with advertising devices.

A notable feature of the device prepared according to the present invention lies in the means whereby a plurality of advertising messages are presented to the view of the operator and nearby spectators during the operation of the device. Moreover the device provides for means of continuous presentation of advertising messages during such time as it is not in operation.

Another notable feature of the present invention is that the amusement device employed in conjunction with the advertising device is of such nature that it would be likely to attract spectators thereby enhancing its utility as an advertising medium.

A further feature of the present invention is that it provides a means for mechanically throwing dice and tallying the scores of a plurality of operators and moreover provides a means for directing the attention of the operator to the advertising message at the termination of each throw.

Another novel notable feature of the device according to the present invention is that it permits the operator to play against various combinations of numbers, for example, if he wishes he may push in one of the various selector slides indicating that he believes that a certain combination of numbers will appear upon the next throw of the dice, for instance, a number 11, and if this number appears the machine automatically actuates a score tally giving him a number of points proportional to the mathematical probability of the number's appearance which he has selected.

In the preferred embodiment of the present invention a plurality of these selector slides is provided, namely:

Slide A—operator scores five points under the following conditions (a) if the machine throws a 7 or an 11 on the first throw or (b) if the machine throws a 4, 5, 6, 8, 9 or 10 on the first throw and the same number on the subsequent throw before a 7 or an 11 appears, otherwise no score.

Slide B—operator scores five points if a 6 appears before a 7, otherwise no score.

Slide C—operator scores five points if an 8 appears before a 7, otherwise no score.

Slide D—operator scores five points if on the first and only throw a 2, 3, 4, 9, 10, 11 or 12 appears otherwise no score.

Slide E—operator scores fifteen points if on the first and only throw a 2, 3, or 12 appears, otherwise no score.

Slide F—operator scores twenty-five points if an 11 appears on the first and only throw, otherwise no score.

A notable feature of the present invention is that the operator can play against these or any other desired number combination by slightly modifying the electrical connections. Accordingly, the game can be periodically varied in order to stimulate interest.

A feature of the present invention is that once placed in operation the operators can use the machine until one of the scores totals five hundred, at which time the entire device is automatically placed in non-operable condition.

The invention will be fully and comprehensively understood from a consideration of the following detailed description when read in connection with the accompanying drawings which form part of the application.

In the drawings:

Fig. 3b is substantially a detail section of a manually operated selector apparatus, with parts omitted for clearness.

Fig. 4 is substantially a vertical section of Fig. 3 on the line 4—4, with parts omitted for clearness.

Fig. 9 is substantially a top plan view of Fig. 4 along line 9—9, with parts omitted for clearness.

Fig. 10 is substantially an exploded perspective of the operating lever 57 and certain of its cooperating members.

Fig. 12a is substantially an exploded perspective of the latch 400 and certain of its cooperating members.

Fig. 12b is substantially a detail section of part of the apparatus shown in Fig. 12.

Fig. 12c is substantially a detail section of part of the apparatus shown in Fig. 12.

Fig. 13 is substantially a side elevation of part of the apparatus shown in Fig. 11.

Fig. 13a is substantially a detail section of part of the apparatus shown in Fig. 13.

Fig. 14 is substantially a vertical section of Fig. 11 along the line 14—14, with parts omitted for clearness.

Fig. 15 is substantially a vertical section of Fig. 11 along the line 15—15, with parts omitted for clearness.

Fig. 15a is substantially a detail section of part of the apparatus shown in Fig. 15.

Fig. 16 is substantially a vertical section of Fig. 11 along line 16—16, with parts omitted for clearness.

Fig. 17 is substantially a vertical section of Fig. 13, along line 17—17, with parts omitted for clearness.

Fig. 18 is substantially a vertical section of Fig. 2, along line 18—18, with parts omitted for clearness.

Fig. 20 is substantially a front elevation of the scoring mechanism with casing removed and parts omitted for clearness.

Fig. 21 is substantially a vertical section of Fig. 2 along line 21—21, with parts omitted for clearness.

Fig. 22 is substantially a fragmentary detail of part of the apparatus shown in Fig. 20.

Fig. 23 is substantially a perspective view of the reset dogs and levers shown in Fig. 21.

Fig. 24 is substantially a detail section of part of the apparatus shown in Fig. 19.

Fig. 26a—26b is a schematic wiring diagram of the apparatus.

In the preferred and herein described embodiment of the present invention there are but two prime movers, namely, the operating handle and a motor driven sweep arm. Accordingly, all moving parts within the apparatus are actuated by one or the other of these members and in order to facilitate clearness of description, the manually operated members will be described first and separately from those members which are primarily actuated by the electric motor and its cooperating elements.

Generally speaking, the device prepared according to the present invention is operated by (1) manipulation of the selector slides, (2) insertion of a coin and manipulation of the coin slide, and (3) movement of the operating lever first in a counterclockwise, then in a clockwise direction, insofar as the stops will permit of the movement.

Figure 1:
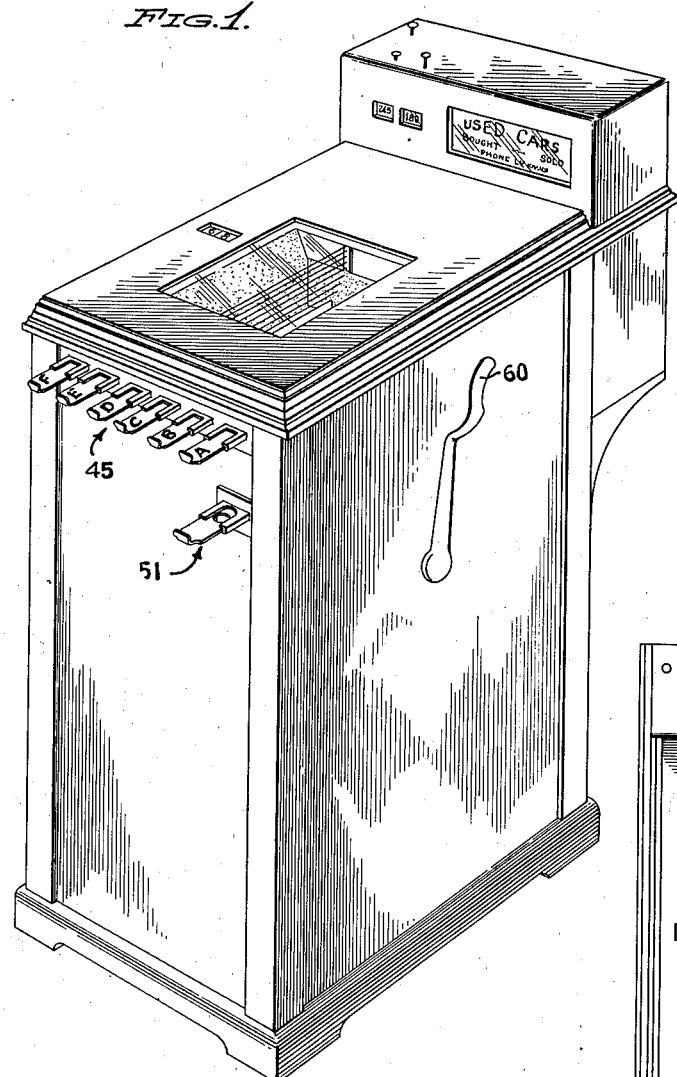
Fig. 1 is a perspective view of the apparatus assembled in its casing.

After adjustment of the selection members generally designated as 45 as will be hereinafter described, a coin is inserted in the cavity in slide 51 and the slide pushed inward (see Figs. 1 and 2) causing the coin to fall thru the chute 59a into the receptacle 59. Reference is made to Fig. 4 for the sequence of operations following the insertion of the coin. When the sliding member 51 is forced inward the pin 52 fixedly attached thereto is advanced along a slot in the member 53 until its motion is arrested, whereupon the slidable member 53 is moved forward thereby pulling upon the cable 53a and moving the member 54 about its pivot 54a (see also Fig. 9). This causes the member 54 to move about its pivot in a clockwise direction, thereby positioning the teeth 54b beneath the upper surface of the fixed member 55 so that the stop 56 mounted on the lever arm 57 which normally rests upon the rack, no longer engages with the teeth thereby permitting the member 57 to be moved in a counterclockwise direction. The spring latch 58 engages with a cavity in the sliding member 51, thereby fixing the cooperating parts in the positions hereinbefore described.

When lever 60 is moved in a counterclockwise direction its motion is transmitted thru the shaft 60a to which it is rigidly attached and along the arm 61 to the lever arm 57, pivoted on the pin 57a, mounted in the frame with which the arm 61 is normally in contact. Movement of the lever arm 57 produces several effects including changing the advertising display, resetting various moving members of the system to "zero" or operating position, throwing the dice into the hopper, and locking the selector members in non-operable position.

Figure 6:
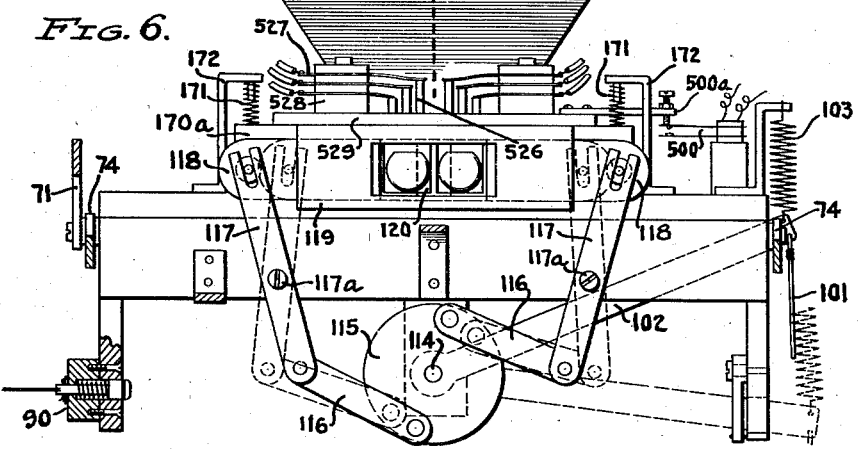
Fig. 6 is substantially a rear elevation of Fig. 4 along the line 6—6, with parts omitted for clearness.
Figure 7:
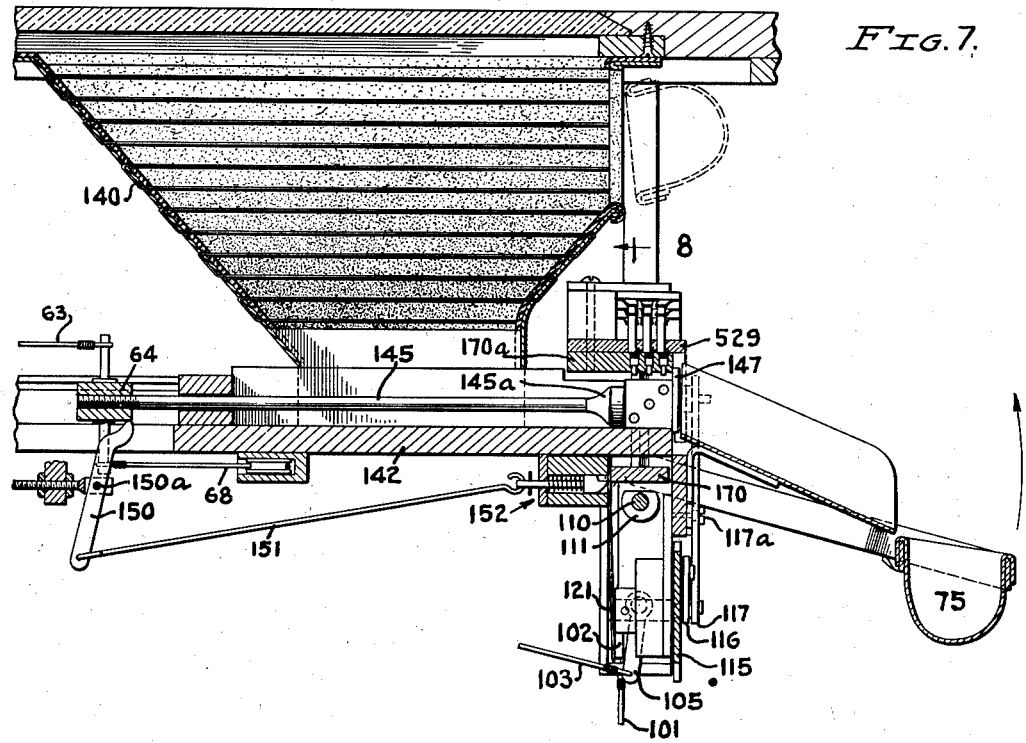
Fig. 7 is substantially a vertical section of Fig. 6 along the line 7—7, with parts omitted for clearness.
Figure 8:
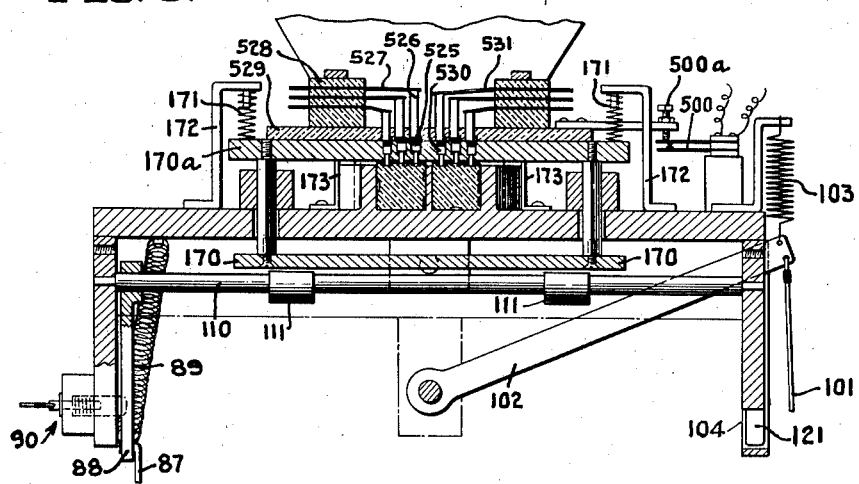
Fig. 8 is substantially a vertical section of Fig. 7 on line 8—8, with parts omitted for clearness.

Referring to Figs. 4 to 9, as the lever arm 57 is moved in the counterclockwise direction by operation of the lever arm 60 as hereinabove described, tension is placed upon the spring and cable 70 whereby the freely pivoted arm 71 is moved in a counterclockwise direction, thereby placing the spring 72 under tension and exerting a counterclockwise torque upon the lever arm 73 which is fixedly attached to the basket-mounting members generally designated at 74 which are freely movable upon the same shaft as the arm 71. Referring to Fig. 10, which shows in exploded perspective the operating lever and its cooperating lever system, as the arm 57 moves in the counterclockwise direction the slotted block 81 advances along the connecting rod 82 until it strikes the adjustable stop 82a whereupon the lever arm 83, mounted on the shaft 84 held in the bearings 92, is moved by means of the said connecting rod. As the arm 83 moves its motion is transmitted thru the shaft 84 to the member 85 which is fixedly positioned on said shaft, thence thru the second class lever 86 pivoted on the pin 86a and by means of the connecting rod 87 to the lever member 88 which is thereby moved in a clockwise direction. Accordingly, as the handle 60 is pulled down the lever member 88, which is fixedly mounted on the shaft 110, moves from a substantially horizontal into a substantially vertical position and, referring to Figs. 7 and 8, its movement is transmitted by the shaft to the cams 111 mounted thereon. Attached to the member 88 is the spring 89 which, when the member 88 is in a substantially vertical position substantially as shown in Fig. 8, is placed under tension, whereby the lever member 88 is held in substantially fixed position against the face of the spring latch generally designated at 90. When the members are so positioned, the cams assume substantially the position shown in Fig. 7.

Referring again to Fig. 10, as the lever arm 83 moves in a counterclockwise direction, the arm 93, fixedly mounted on the shaft 84, likewise moves, transmitting its movement by means of the connecting member 94 and pin 95 to the arm 96. This causes the arm 96 to move in a clockwise direction thereby placing the spring 97 under tension and when the member 96 has reached a substantially vertical position, the freely movable member 98 bearing the stop block 98a falls, thereby substantially fixedly positioning the said member 96 against the face of the block 98a by the tension in the spring 97. Referring to Fig. 13, the member 96 is shown in locked position under the latch member 98. As the member 96 moved in a clockwise direction as hereinbefore described tension in the springs 300 and 301 was released, thereby permitting the lever members 302 and 305 to move. The lever member 302 attached to the shaft 303 moved into the vertical position shown in Fig. 13 by tension in the spring 304 and when so positioned the dog 309, which is also fixedly attached to the shaft 303, is positioned as shown in Fig. 15 so that the pivoted pawl member 310, held in position by the spring 311, engages with the teeth of the ratchet wheel as shown. As tension in the spring 300 is released the lever member 305 mounted on the shaft 306 moves in a counterclockwise direction until its movement is stopped by the latch member 307 which is fixedly positioned upon the spring lever 308 (best illustrated in Fig. 13a).

Referring again to Fig. 10, as the arm 83 moves in a counterclockwise direction, as hereinbefore described, the member 100, fixedly positioned on the shaft 84, is also moved, whereby the lever arm 102 fixedly mounted on the shaft 114, connected to the said member 100 by the connecting rod 101, is moved into substantially the lower position as shown in Fig. 6, thereby placing the spring 103 under tension. Referring to Figs. 6 and 8, as the lever arm 102 moves downward its motion is transmitted by the shaft 114 to the place member 115 which is also fixedly mounted on the shaft 114, thereby actuating the connecting members 116, pivoted to the members 115 and 117, and transmitting the movement of the member 115 to the member 117 pivoted at the point 117a, whereby the slidable members 118 are caused to move toward each other, thus at least partially closing the opening, generally designated at 120, in the plate 119. As the lever member 102 moves downward it is forced into a seat in the framework by the spring 121 so that it is held in substantially locked position such as shown in Fig. 7.

Referring to Fig. 9, as the lever arm 57 moves in a counterclockwise direction it pulls the cable 63 which passes thru pulleys and is attached to the slidable block 64, thereby moving said block from the position shown in Fig. 9, toward the left until its movement is stopped by the framework of the track generally designated as 65, whereupon a recess in the bottom of the block engages with the spring latch generally designated as 66 thereby substantially fixing the position of the block.

Figure 19:
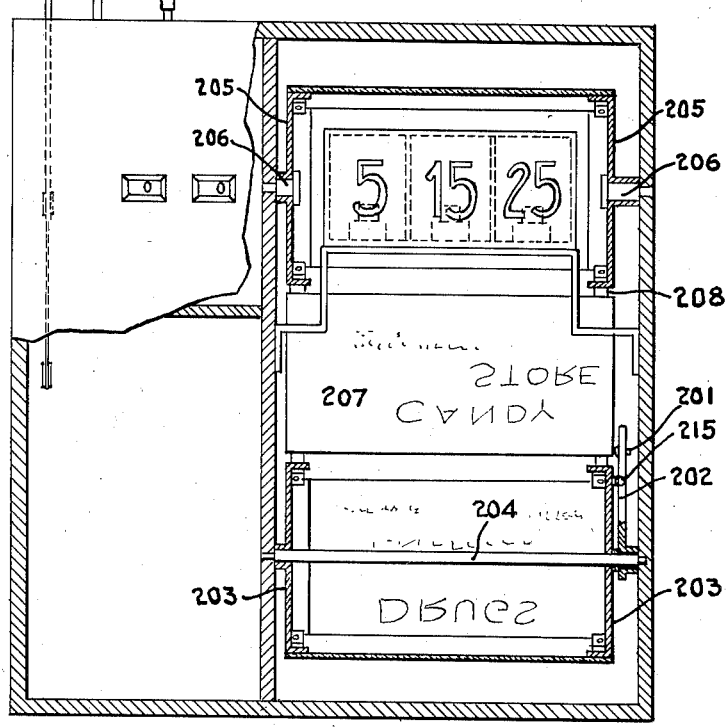
Fig. 19 is substantially a vertical section of Fig. 18 along the line 19—19, with front cover of scoring mechanism shown in position.

Referring to Figs. 18 and 19, as the lever member 57 moves in the counterclockwise direction, the freely pivoted lever member 202 is also moved in a counterclockwise direction by the connecting rod 201 attached thereto, thereby operating the advertising device generally designated as 200, which comprises generally a plurality of rotatable spool-like members carrying an endless strip of advertising material. The member 203, preferably a hollow frame altho a solid block can be used if desired, is freely rotatable upon the shaft 204 which is journalled in the sides of the casing substantially as shown. 205 is a cut-away framework with end members pivoted at 206, substantially as shown, said framework and blocks being freely rotatable about an axis parallel to that of shaft 204. The transparencies 207 are joined by substantially flexible perforated members 208 and pass around the members 203 and 205 so that when these blocks are rotated different transparencies will be placed in front of a source of illumination generally designated as 209, and supported on a bracket substantially as shown, whereby the transparencies may be viewed thru the window 210, which, in the preferred embodiment of the present invention, can carry additional advertising material. The pins 212 serve two functions; first, they insure proper register of the transparencies with the face of the block 203, and, second, they strike against the dog 213 which is held under tension by the spring 214, thereby preventing clockwise rotation of the block. Pins mounted in the frame 205 are likewise provided to insure proper alignment of the transparencies as they are moved during operation. The pins 215 are fixedly positioned in the end member 203 and their outer surfaces are beveled so that the spring lever 202 will slide over them when moved in a clockwise direction but not when moved in a counterclockwise direction. In operation, when the lever 57 is returned in a clockwise direction, lever 202 also moves in a clockwise direction, the member 203 being prevented from moving by the dog 213, and after the member 202 has passed over the head of the pin 215 it is positioned behind same substantially as shown in Fig. 18. Upon being moved in a counterclockwise direction, during subsequent operation of the machine, the arm 202 strikes against the pin 215, thereby causing the block 203 to move about its axis and positioning a different transparency before the window 210. Lamps 216 are provided for illumination of the transparencies inasmuch as the illuminating means generally designated as 209 function intermittently as will be hereinafter described. In one embodiment of the present invention the front side of the casing of the illuminating means generally designated as 209 is cut away substantially as shown in Fig. 19 so that when the illuminating means positioned within said casing are in operation, the cut-away portions will be visible thru the transparencies. The present inventor has found that the operator's attention can be readily attracted to the advertising messages by causing the hereinabove mentioned illuminating means to function intermittently and in conjunction with the scoring means whereby the number of points scored in each play will be visibly displayed in the background of the advertising matter substantially as shown in Fig. 19.

Returning to Figs. 4 and 9, as the lever 57 is moved in a counterclockwise direction, it strikes the member 130 which is pivoted about the point 131, thereby moving said member in a clockwise direction and, by means of the cable 132, moving the dog 133 in a clockwise direction, thereby releasing the basket-supporting frame 174. As the frame is released tension in the spring 72 causes the entire basket and supporting frame to move upward about its pivot and throw the dice 77 into the hopper generally designated at 140.

Figure 5:
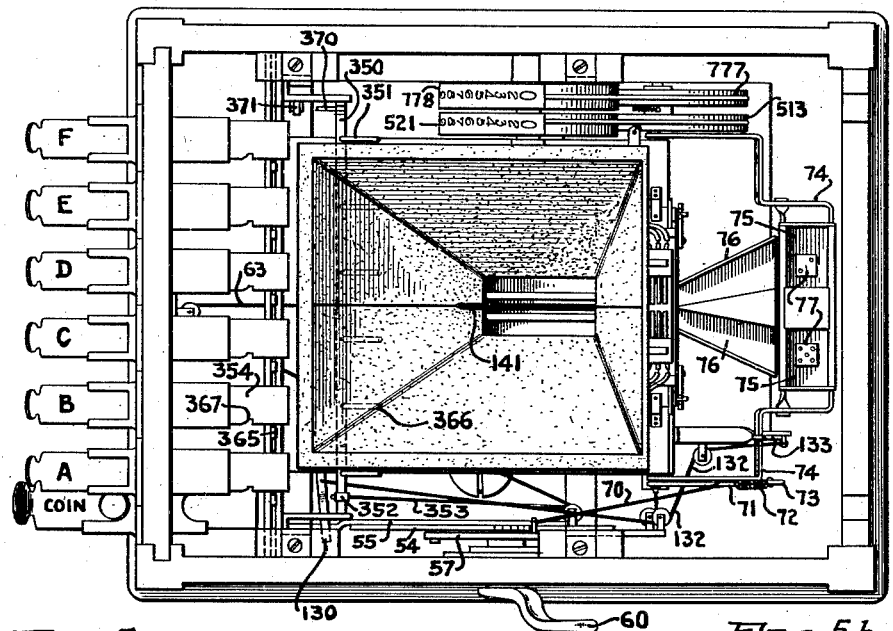
Fig. 5 is substantially a top plan view of the apparatus with cover removed and advertising device omitted.
Figure 5A:
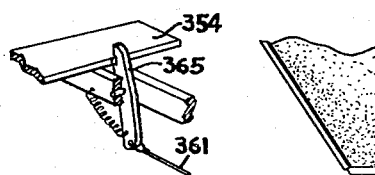
Fig. 5a is substantially a detail perspective of the selector apparatus locking mechanism.
Figure 5B:
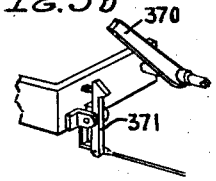
Fig. 5b is substantially a detail perspective of the selector apparatus locking mechanism.

Referring to Figs. 5, 6 and 7, the hopper 140 is divided by the framework of wire designated generally at 141 so that when the basket assumes the position shown in dotted form in Fig. 7 the dice will fall into different compartments within the hopper and descend until they strike the baseplate thereof 142.

Counterclockwise movement of the lever arm 57 also serves to lock the selector slides, generally designated as 45, in an unoperable position. This is accomplished by counterclockwise rotation of the shaft 350 which is journalled in the frame and carries the arm 35a which is connected to the lever arm 57 by the cable 353 thru means not shown. Referring to Figs. 3, 3a, 5, 5a and 5b, when the selector slides are operated, using the B slide for example, as the member 354 is pushed inward as far as possible by the operator, the plate 355 is moved upward by the cable 360 so that the pin 356, actuated by the lever arm 357 and spring 358, seats itself in the hole in plate 355, thereby locking the plate in position so that electrical connection exists between the contact points generally designated as 359. As the plate 355 is moved upward it pulls the cable 361, attached to the member 362 integral with said plate, which is connected to the pivoted latch dog 365 so that when the arm 366, fixedly mounted on the shaft 350, rotates in a counterclockwise direction it strikes the end of the member 354 thereby advancing same until the dog 365 engages with the slot 367 in the sliding member thereby substantially locking same in position. The cables 360 and 361 are adjusted to lengths such that the dog 365 will not engage the slot in the sliding member 354 unless the plate 355 is held in locked position by the pin 356, accordingly the selector slides cannot be operated after the lever arm 57 has been moved in a counterclockwise direction because they cannot be pushed in far enough to engage the dogs or close the switch contact, being prevented by the stop members corresponding to member 366. Clockwise rotation of the shaft 350 is prevented by the lever arm 370 fixedly mounted on the shaft and engaging with the spring latch generally designated as 371.

The selector mechanisms actuated by slides D, E and F operate in an analogous manner. Referring to Fig. 3b, the cable 380 corresponds to the cable 360 in Fig. 3a and likewise serves to move the plate member 385 in an upward direction until the pin 386, actuated by spring 388 acting thru the lever 387, engages in an opening in said plate thereby substantially fixing the position of same. The cable 381 actuates the corresponding slide locking mechanism in a manner analogous to cable 361 as hereinabove described. The cam 391 is normally in the position shown in Fig. 3b.

Referring to Fig. 4, as the lever member 57 is returned in the clockwise direction it moves the pivoted stop 143 which is connected by means of a cable 144 to the spring latch 66 thereby opening the latch and releasing the block 64 which is pulled along its track toward the right by the dashpot 67 connected to said block 64 by the cable 68. The dashpot comprises a cylinder, closed at one end by a flap valve, within which slides a close fitting weight so that when the weight is positioned at the top of the upright cylinder and released it will slowly fall, the speed of its fall being regulated by leakage of air from the closed portion. These details are best illustrated in Fig. 9. Attached to the block 64 are the slidable piston members 145 carrying the piston heads 145a which move forward as the block 64 advances, thereby moving the dice along the base plate 142 toward the upright stop plate 147. Referring to Fig. 7, as the block 64 advances along its runway it engages with the lever member 150 which is pivoted about the point 150a and connected to the spring latch generally designated at 152 by the connecting rod 151. When the dice are positioned against the plate 147, the member 150 has been moved in a clockwise direction as heretofore described and the frame generally designated at 170 has been released so that the surface of the plate 170a rests upon stop members 173 and is close to the upper surface of the dice, being firmly held in this position by the springs 171 mounted under the L brackets 172. These details are best illustrated in Figs. 6 and 8.

Plate 170a is pierced with a plurality of openings in each of which is seated a pin similar to pin 525. These pins comprise a lower metallic portion projecting beyond the surface of the plate 170a and an upper head portion adapted to engage with the plate and prevent the pin from falling down thru the opening. Positioned above the metallic part of the pin is an insulating member equal in diameter to the diameter of the pin and of thickness such that when the lower end of the pin is flush with the lower face of the plate 170a the upper surface of the insulating member is positioned above the upper surface of said plate. These pins, of which there are eighteen, are arranged in the plate 170a so that they will engage with the surface of the dice substantially as shown in Fig. 8, accordingly, inasmuch as the indicia on the face of the dice are substantially localized cut-away portions, when the dice are positioned as shown the lower ends of the pins fall into these cut-away portions in the dice thereby permitting the pin and the insulating head to descend until the upper surface of said head is flush with the upper surface of plate 170a. The metallic members 526 are positioned in holes cut in the insulating plate 529 and held under tension by the springs 527 mounted in the insulating blocks generally designated as 528. As is shown in Fig. 8, the axes of these pins generally designated as 526 are slightly off center from the axes of the pins upon which they rest, accordingly, when the pins such as 425, are pushed upward the members 526 are likewise pushed upward and out of contact with the surface of plate 170a but when the pins are in the lower position, such as for example pin 530 in Fig. 8, an electrical circuit is completed between the spring member 531 and the plate 170a. Hence when the dice are positioned as shown the upper surfaces thereof can be read by means of the pins, the total number of pins depressed establishing a corresponding number of electrical circuits which represent the total numerical value displayed.

Figure 2:
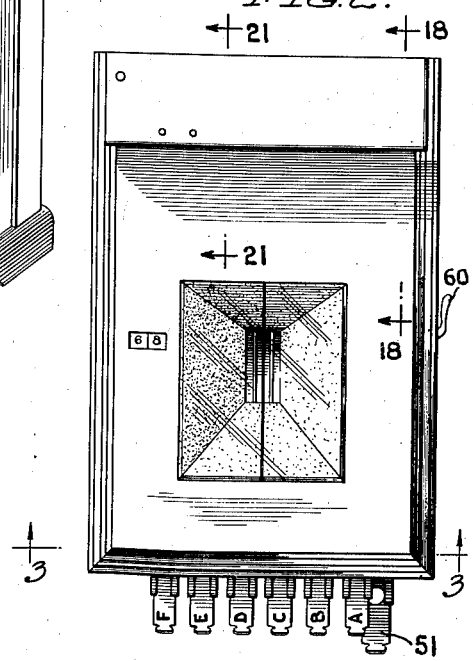
Fig. 2 is a top plan view of the apparatus shown in Fig. 1.
Figure 11:
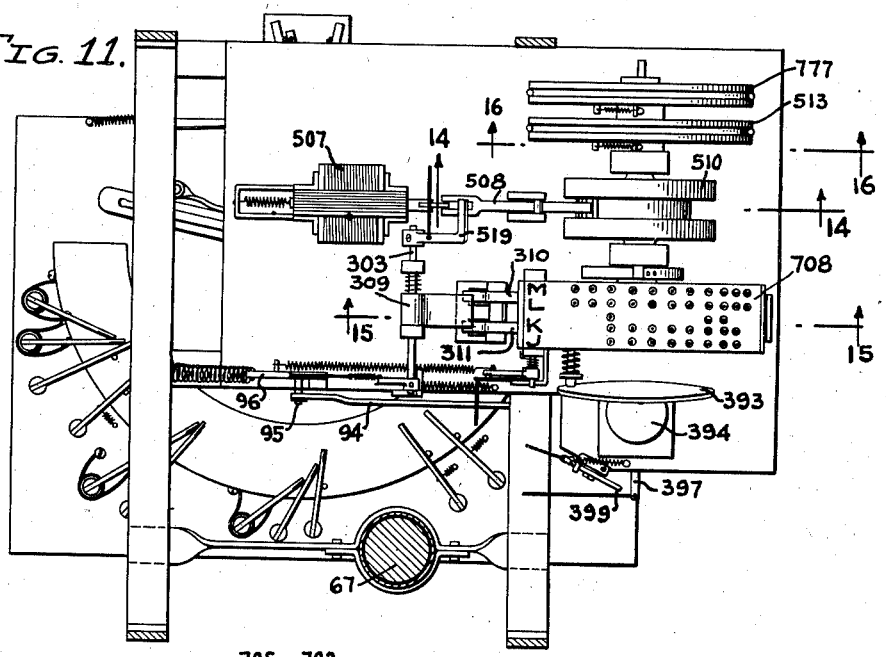
Fig. 11 is substantially a horizontal section of Fig. 4 along the line 11—11, with parts omitted for clearness.

When the reading head generally designated as 170 descends as hereinbefore described until it is positioned as shown in Fig. 8, the adjustable member 500a fixedly mounted on the head closes the switch generally designated as 500 thereby starting the motor 501 which rotates the arm 502 in a counterclockwise position over the plate 503 carrying a plurality of contacts generally designated as 504. These contacts are connected, as shown in Figs. 26a–26b, to the hereinbefore described reading head generally designated in the wiring diagram as 505 so that the total number of closed circuits between the pins generally designated as 526 and the plate 170a will be read off by the arm as it passes over the points and each time a complete circuit is found by the sweeping arm it completes the circuit between the source of energy and the relay 506. In this manner the total number of exposed indicia on the upper surface of the dice will correspond to the number of impulses received by the relay. The relay 506 operates the solenoid 507 which, referring to Figs. 11 and 13, is connected as shown to the member 508 which operates as a ratchet against the pins generally designated as 509 mounted in the wheel 510 which is fixedly positioned upon the sleeve 511. The sleeve 511 also carries fixedly positioned thereon the wheel 512 and the pulley 513 and when moved in a clockwise direction by impulses conveyed to the solenoid 507, places tension in the spiral spring 513 which is joined to the rotatable member by the pin 514 and attached to the standard 515 by the pin 516. The ratchet wheel 518 is fixedly attached to the wheel 512 and engages with the pawl 310 actuated as hereinabove described. In operation, impulses conveyed by the sweeping arm to the solenoid pull upon the member 508a which is connected by means of a second class lever 508b to the pawl 508 which rides in the guides 508c and 508d. The pawl 508 is held against the pins 509 by the spring 508e and accordingly is brought back one pin corresponding to each impulse conveyed by the solenoid. Hence if the exposed faces of the dice show for example a four the wheel 510 will be advanced four pins by the pawl 508. The L-shaped member 519, fixedly attached to the shaft 303 upon which is mounted the trip dog 309, freely rides upon the surface of the pawl 508 so that when the shaft 303 is moved in a clockwise direction by tension in the spring 301 the ratchet pawl 310 will be tripped, thereby releasing the ratchet 518, and the pawl 508 will be pushed down about the fulcrum 508c thereby releasing the wheel 510, accordingly, the entire system 510, 511, 512 will return in a counterclockwise direction to zero position, namely, until the stop 520 strikes the frame 521. The pulley 513 is connected to a display wheel 521 carrying a series of numbers from two to twelve which is exposed to the operator's view substantially as shown in Fig. 2, accordingly, as soon as the upper surface of the dice have been ready by the electrical means hereinabove described, the total number thereon displayed will be indicated by the wheel 521.

Figure 12:
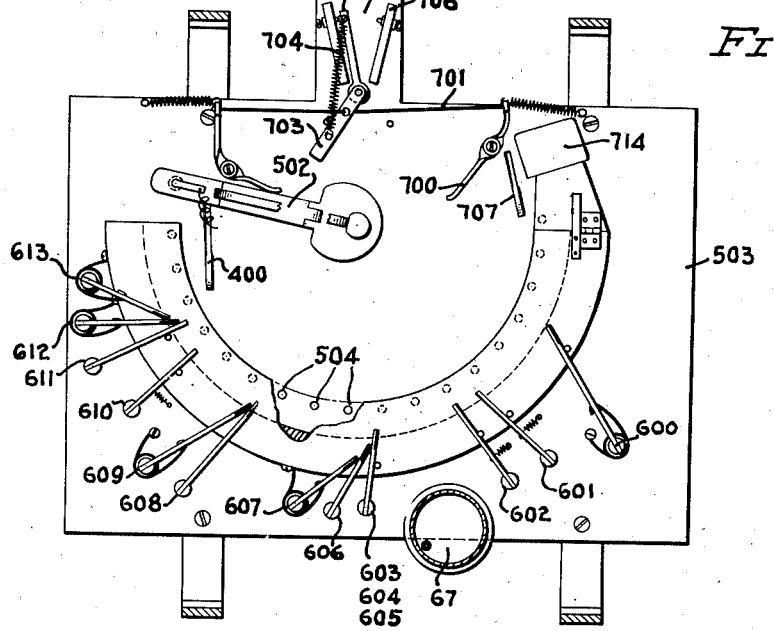
Fig. 12 is substantially a horizontal section of Fig. 4 along the line 12—12, with parts omitted for clearness.

Referring to Fig. 12, as the arm 502 moves in a counterclockwise direction it passes over the contacts as hereinbefore mentioned and strikes the dog 700 which is connected by means of the line 701 to the reverse switch generally designated as 702 so that when the dog is moved in a clockwise direction by the lever arm it pulls over the movable arm 703 thereby causing the spring 704 to spring the switch arm 705 over into contact with the member 706. When so positioned the motor is reversed and the arm 502 then moves in a clockwise direction.

Near the end of the counterclockwise travel of the arm 502, it engages with the freely pivoted latch 707 which is attached by a cable (not shown) to the member 308 (Fig. 13a). Accordingly, when the latch is pulled the member 308 releases the arm 305 which then moves in a counterclockwise direction thus rotating the shaft 306 and the cam 712 fixedly positioned thereon in a counterclockwise direction and permitting the arcuate hood member generally designated as 708, pivoted as shown at 713, to move downward until the contact pins generally designated as 709 rest upon the surface of the wheels 512 and 710, the hood being held in position thereupon by the spring member 711. The hood member carries several rows of contact points classified as J, K, L and M, which are connected as will be hereinafter described. Metallic plates, one of which is designated 780, are set flush with the surface of the wheel 710 and 516 and are arranged so that the plate mounted on the wheel 710 makes contact with three rows of contact points, namely, rows L, M, and the center row not designated by a letter, and the plate set in the wheel 512 makes contact between the rows of contacts designated as J and K. These metallic members are adjusted in width so that they do not simultaneously make contact with more than one pin in the same row.

Referring to Fig. 12, as the arm 502 begins its return trip in a clockwise direction it engages with the frog 714 which lifts up the extremity of the lever arm permitting same to ride upon the track generally designated as 715. Arranged along the periphery of this track are a plurality of movable members shown in detail in Fig. 12c which serve as switching means for operating the scoring mechanism as will be hereinafter indicated. These members consist of a rotatable shaft bearing a lever arm which engages with the arm 502. On one end of the shaft is mounted a cam which can operate a spring or jack type switch so that as the arm 502 moves along, these switches are thrown and, after the arm has passed, are moved back into open position by springs substantially as shown in Fig. 12. Toward the end of its clockwise trip the arm 502 engages with the latch member 400 tripping same and operating several members connected thereto substantially as shown in Fig. 12a.

Figure 3:
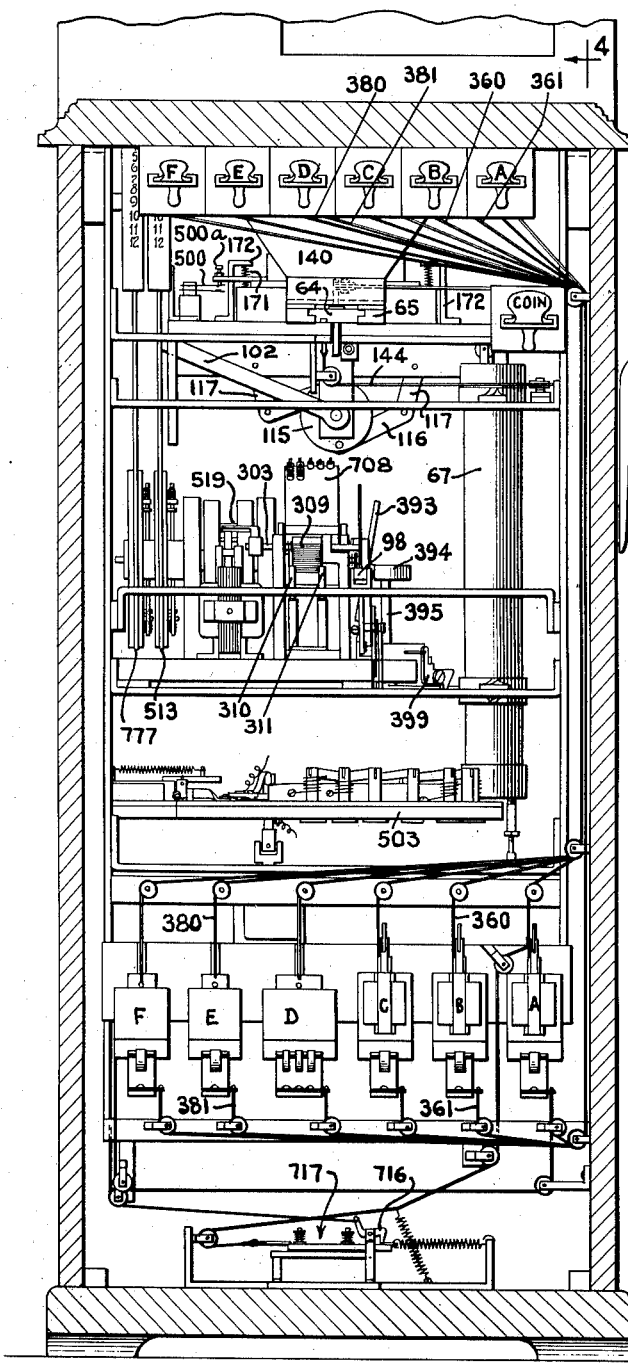
Fig. 3 is substantially a front elevation of Fig. 2 along the line 3—3, with the front casing removed and parts omitted for clearness.

Referring to Fig. 12a, as the latch 400 is tripped the latch 371 likewise opens, thereby permitting the shaft 350 to move in a clockwise direction thus releasing the selector slides. The member 105 is moved in a clockwise direction, thereby forcing the member 102 out of its seat in the frame and permitting it to move upward under tension in the spring 103 thereby opening the closure members 118 and permitting the dice to fall down the chutes 76 into the baskets 75. The latch 90 is pulled, releasing the lever arm 88 which moves under tension in the spring 89 thereby rotating the shaft 110 and cams 111, and raising the head and reading means generally designated as 170. The member 98 is moved upward in a counterclockwise direction thereby releasing the arm 96 which moves in a counterclockwise direction under tension in the spring 97 thereby raising the reading hood generally designated as 708, locking lever arm 305 behind the spring stop 307, and moving lever arm 302 in a clockwise direction thereby tripping the ratchet pawls and returning the wheels 512 and 710 to "zero" position substantially as hereinabove described. The latch 379 is moved in a counterclockwise direction when the member 400 is tripped thereby releasing the lever arm 397 and permitting same to move in a counterclockwise direction under tension in the spring 398 as will be hereinafter described in conjunction with the operation of selector slide A. The function of the latch 716 which is connected with the converting switch generally designated in Fig. 3 as 717 will also be hereinafter described in connection with the operation of selector slide A. When the latch 400 is tripped it moves the lever arm 392 in a clockwise direction, thereby rotating the shaft 391 carrying the cams 390. These three cams operate the trip mechanism in the switch D, E and F substantially as shown in Figs. 3b and 12a so that after the machine has once been operated, viz. the dice thrown and read, these cams will turn throwing the selector slide into non-operative position and breaking contacts between the various parts of the circuits substantially as hereinafter described.

Figure 12D:
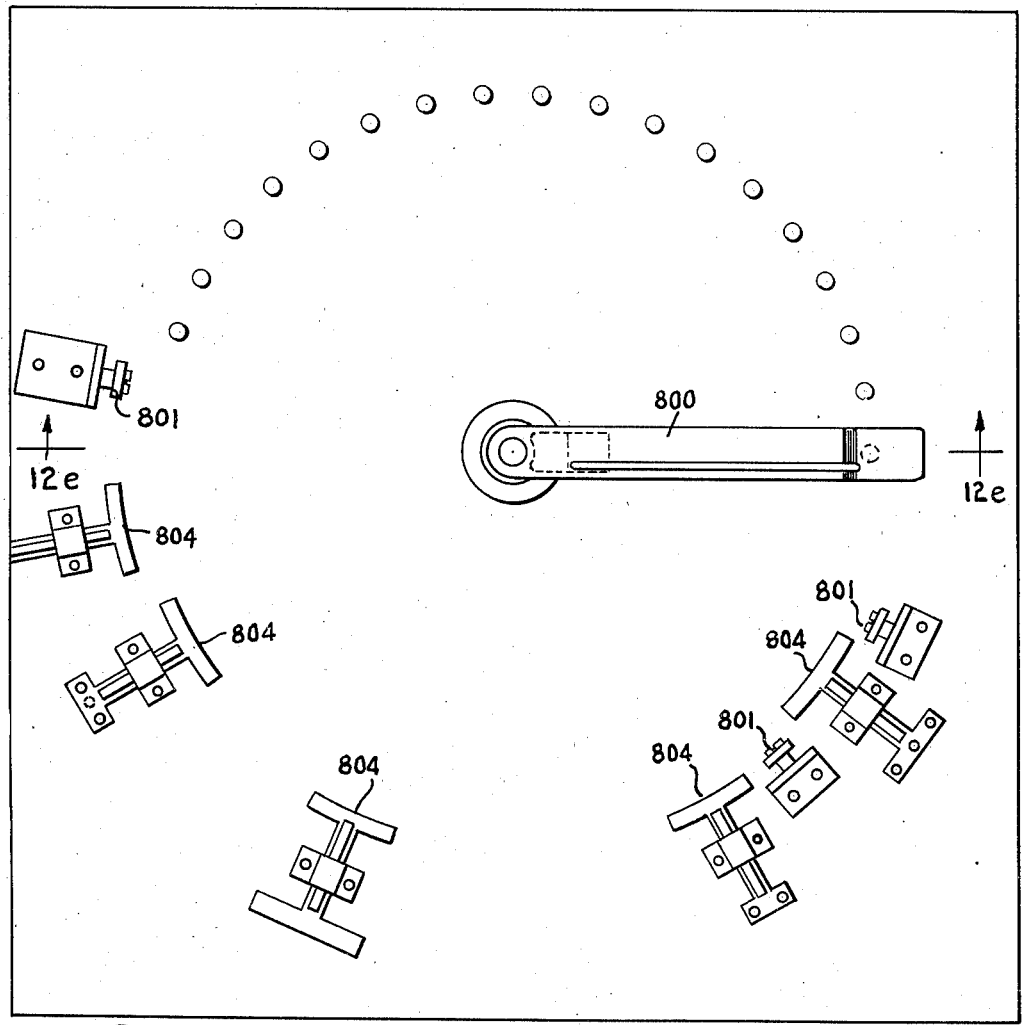
Fig. 12d is substantially a top plan view of a modification of part of the apparatus shown in Fig. 12.
Figure 12E:
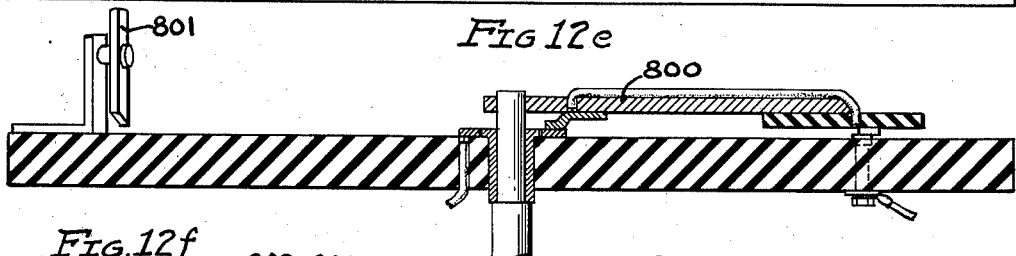
Fig. 12e is substantially a section of Fig. 12d along the line 12e—12e.
Figure 12F:
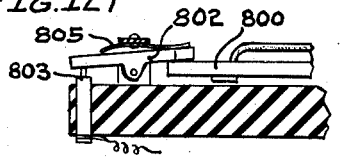
Fig. 12f is substantially a detail section of part of the apparatus shown in Fig. 12d.

Referring to Figs. 12d, 12e and 12f, the lever arm 800 functions in substantially the same manner as the lever arm 502 hereinbefore described and the latches 400 and 707 are arranged, in this modification of the present invention, substantially as shown at 801. The spring switches shown in Fig. 12 and designated as 600—613 are replaced in the modification shown in Fig. 12d by the members generally indicated as 804, the operation of which is detailed in Fig. 12f wherein 800 represents the lever arm, 802 a pivoted second class lever held under spring 805 and 803 a spring switch substantially for the purpose hereinbefore described. A notable feature of this modification of the present invention is that it permits of the use of a uni-directional motor thereby dispensing the reversing apparatus which was described in connection with the preferred embodiment.

Figure 25:
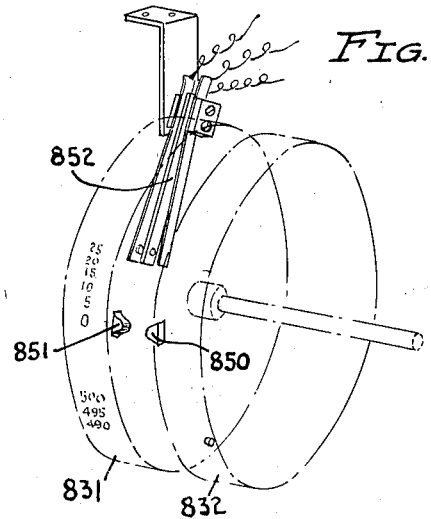
Fig. 25 is substantially a detail perspective of part of the scoring mechanism shown in Fig. 20.

Referring to Figs. 20, 21, 22, 23, 24 and 25, the score totalizing mechanism is operated by the solenoids 676, 677 and 675 which when actuated move the pawl members 825, 826 and 827 which engage with ratchet wheels 829 and 830 attached to and rotatable with the wheels 831 and 832, respectively, substantially as shown in Figs. 22 and 24. These ratchet pawls generally designated as 825, 826 and 827 are lifted out of engagement with the ratchet teeth when the pivoted dogs 833 and 834 are moved in an upward direction by actuation of the lever and cable system generally designated as 835 so that when two operators are using the device it is possible by adjustment of the means 835 to register the impulses received by the solenoid upon either but not both of the wheels 831 and 832. At the conclusion of the operation of the device the reset push button 840 is depressed, thereby pulling upon the cable 841 which is attached to the dogs 842 and 843 lifting the same out of engagement with the ratchet teeth and permitting the wheels 831 and 832 to return to "zero" position by means of the spiral spring, substantially as shown. Referring to Fig. 25, as the wheels 831 and 832 reach an indicated value of 500 or any other desired predetermined value, the stops 850 and 851 operate the spring switch generally designated as 852 so that the solenoid 853 is actuated thereby tripping the latch 58 and permitting the coin slot 51 to return to the outer or operable position substantially as shown in Fig. 4.

In order to facilitate a more complete understanding of the matter of the present invention, particularly as regards the electrical circuits created during the course of its operation, hypothetical situations involving scoring and non-scoring throws for each of the selector slides will be hereinafter described.

Slide A

Figure 3A:
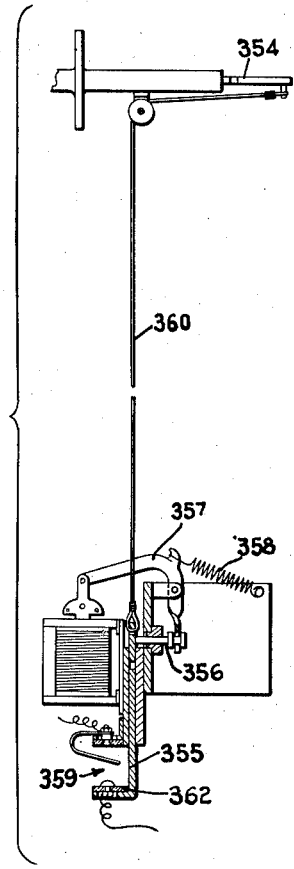
Fig. 3a is substantially a detail section of an electrically operated selector apparatus, with parts omitted for clearness.

When slide A is pushed inwardly it actuates a switch heretofore described and illustrated in Fig. 3a and in addition to operating the mechanism as has been described this slide and this slide only, being attached by a cable to the lever member 397, moves said lever 397 in a clockwise direction. As the lever 397 is moved in the clockwise direction it actuates the shaft 395 to which it is fixedly attached hereby moving the cam 394 and causing the plate 393 to move from a non-vertical to a vertical position, thus pushing the pin 775 which is attached to the idle wheel 710 mounted on the shaft 776 which is rotatable within the sleeve member 511. The shaft 776 carries a pulley wheel 777 to which is attached a cable operating a display wheel 778, carrying numbers from two to twelve. The pin 775 engages with a corresponding opening in the wheel 512 so that when the solenoid 507 is actuated by electric impulses conveyed from the reading mechanism hereinabove described the entire system 512, 511, 776, 710 moves in a clockwise direction. The wheels 710 and 512 are held in locked engagement by the pin 775 until the conclusion of the first throw of the dice and reading of same, thereupon when the latch 400 is tripped by the reader arm 502 the latch 399 is tripped, thereby permitting the spring 398 to move the lever arm 397 in a counterclockwise direction.

Another function of the selector slide A is to cock the converting switch generally designated as 717 (refer to Fig. 3). When the selector slide is pushed in, the upper plate of this switch is pulled to the left and cocked under the latch 716 so that the contacts are aligned as follows: 651—652; 653—654; 655—656.

Assuming for purposes of illustration that a seven has been thrown, referring to Figs. 26a—26b, the circuits are completed as follows:

Switch A—terminal 657 on converting switch—terminal 655 on converting switch—terminal 656 on converting switch—terminal number 7 in row L of hood—connecting bar 780—terminal number 7 in row M of hood—line 691.

Switch A—spring trip switch 609—solenoid 675—illuminating means 678—line 690.

The lines 690 and 691 are connected to transformer 900, accordingly, when the circuit is completed as above indicated current will pass thru the solenoid 675 thereby advancing scoring tally wheel one notch or an equivalent of five points.

Solenoid 627—spring trip switch 602—converting switch terminal 654—converting switch—terminal 653—terminals 2, 3 and 12 of row L in hood.

Solenoid 627—spring trip switch 613—switch A—terminal point 657 on converting switch—terminal 655 on converting switch—terminal 656 on converting switch—terminal 7 on row L of hood—connecting bar 780—terminal number 7 in row M of hood—line 691.

When the circuit is completed as above indicated between the lines 690 and 691 and the solenoid 627, the solenoid 628 operates thereby pulling the pin out of the plate shown in Fig. 3a, causing the switch A to open, and breaking the circuit.

Accordingly when a seven is thrown the score tally is advanced five points and the machine is thrown into non-operable condition.

The scoring mechanism is also actuated when an eleven appears, the circuits being in this instance:

Switch A—terminal 11 of row J of hood—connecting bar 781—terminal 11 on row K of hood—terminal 11 on row L of hood—connecting bar 780—terminal 11 on row M of hood—line 691.

Switch A—spring trip switch 609—solenoid 675—illuminating means 678—line 690.

The score tallying mechanism is actuated when the lines 690 and 691 are connected to the solenoid as above indicated.

Solenoid 627—line 690.

Solenoid 627—spring trip switch 602—terminal 654 on converting switch—terminal 653 on converting switch—terminals 2, 3, and 12 on row L of hood.

Solenoid 627—spring trip switch 613—switch A—terminal 11 on row J of hood—connecting bar 781 on row K of hood, terminal 11 on row L of hood—connecting bar 780—terminal 11 on row M of hood—line 691.

When the connections are completed as indicated between the lines 690 and 691 and solenoid 627, the solenoid 628 is actuated and the device is put in non-operable condition.

When on the first throw a two, three or twelve appears, the following circuits are made:

Switch A—terminal 657 on converting switch—terminal 655 on converting switch—terminal 656 on converting switch—terminal 7 on row L of hood.

Switch A—spring trip switch 609—solenoid 675—illuminating means 678—line 690.

The circuit between the score tallying mechanism and the lines 690 and 691 not being completed as above indicated, the operator does not score upon this throw.

The circuits of the solenoids 627 are as follows:

Solenoid 627—line 690.

Solenoid 627—spring trip switch 602—terminal 654 on converting switch—terminal 653 on converting switch—terminals, 2, 3, and 12 on row L of hood—connecting bar 780—terminals 2, 3, and 12 on row M of hood—line 691.

Solenoid 627—spring trip switch 613—switch A—terminal 657 on converting switch—terminal 655 on converting switch—terminal 656 on converting switch—terminal 7 on row L of hood.

The circuits between the solenoid 627 and the lines 690 and 691 being completed as above indicated, the solenoid 628 is actuated when the device is put in non-operable condition. Accordingly when this particular combination of numbers is thrown the operator makes no score and the device is in condition such that a second throw can be made only by operation of the coin slot.

After a 4, 5, 6, 8, 9 or 10 is thrown on the first throw, the following circuits are completed:

Switch A—spring trip switch 609—solenoid 675—illuminating means 678—line 690.

Switch A—terminal 657 on converting switch—terminal 655 on converting switch—terminal 656 on converting switch—terminal 7 on row L of hood.

Switch A—terminal 11 on row J of hood.

When this combination of numbers is thrown the score tallying mechanism is not actuated.

The connections to the solenoid are as follows:

Solenoid 627—line 690.

Solenoid 627—spring trip switch 602—terminal 654 on converting switch—terminal 653 on converting switch—terminals 2, 3, and 12 on row L of hood.

Solenoid 627—spring trip switch 613—switch A—terminal 657 on converting switch—terminal 655 on converting switch—terminal 656 on converting switch—terminal 7 on row L of hood.

Solenoid 627—spring trip switch 613—switch A—terminal L on row J of hood.

The circuit between the solenoid 627 and the line 690 and 691 not being completed, the solenoid is not actuated and accordingly the switch A is not tripped into open position, hence the player is free to make another play without operating the coin slot.

After conclusion of the first throw the latch 400 is tripped by the moving reading arm 502 thereby tripping the latch 379, thereby permitting the lever arm 397 to move in a counterclockwise direction, thus causing the plate 393 to assume a substantially non-vertical position and permitting the spring pin 715 mounted in the wheel 710 to come out of engaged relationship with the wheel 512. Accordingly when the solenoid 507 is actuated by the impulses conveyed by the reader arm 502, the wheel 512 will be moved but the wheel 710 will remain stationary. In this manner the player's first throw is shown on the upper face of the cabinet by the indicating wheel 718 and subsequent throws are indicated by the wheel 521. Furthermore, the cable attached to the L-shaped member 519 (refer to Fig. 11) being attached to the selector switch A, rests upon the pawl 310 only as long as the switch A is closed, hence at the conclusion of the first throw, the wheel 512 would be turned to "zero" position when its pawl is tripped whereas the wheel 710 remains in its initial position. At the conclusion of the game, that is when a winning or losing number is thrown, the switch A is tripped and the member 309 is moved over onto both pawls 311 and 310, tripping same and returning both wheels to "zero" or operable position.

If upon the second throw, the player having thrown 4, 5, 6, 8, 9 or 10 upon the first throw, the player should duplicate this throw, the score tallying mechanism is actuated by a completion of the following circuits:

Switch A—spring trip switch 619—solenoid 675—iluminating means 678—line 690.

Switch A—terminal 657 on converting switch—terminal 658 on converting switch—terminals 4, 5, 6, 8, 9 and 10 on row J of hood—connecting bar 781—terminals 4, 5, 6, 8, 9 and 10 on row K of hood—terminals 4, 5, 6, 8, 9 and 10 in row L of hood—connecting bar 780—terminals 4, 5, 6, 8, 9 and 10 in row M of hood—line 691.

Solenoid 627 is placed in circuit with the lines 690 and 691 substantially as follows:

Solenoid 627—line 690.

Solenoid 627—spring trip switch 602—terminal 654 on converting switch—terminal 7 in row L of hood.

Solenoid 627—spring trip switch 613—switch A—terminal 657 on converting switch—terminal 658 on converting switch—terminals 4, 5, 6, 8, 9 and 10 on row J of hood—connecting bar 781—terminals 4, 5, 6, 8, 9 and 10 on row K of hood—terminals 4, 5, 6, 8, 9 and 10 on row L of hood—connecting bar 780—terminals 4, 5, 6, 8, 9 and 10 on row M of hood—line 691.

The circuit being completed between the solenoid 627 and the lines 690 and 691, the solenoid 628 is actuated thereby throwing the device into non-operable condition.

When on the second throw of the device a seven appears instead of 4, 5, 6, 8, 9 or 10, circuits are completed substantially as follows:

Switch A—spring trip switch 609—solenoid 675—illuminating means 675—line 690.

Switch A—terminal 657 on converting switch—terminals 4, 5, 6, 8, 9 and 10 in row J of hood—connecting bar 781—terminals 4, 5, 6, 8, 9 and 10 on row K of hood.

The circuit not being completed between the score tallying mechanism and the lines 690 and 691, no score is made.

Circuits are completed to the solenoid 627 as follows:

Solenoid 627—line 690.

Solenoid 627—spring trip switch 613—switch A—terminal 657 on converting switch—terminal 658 on converting switch—terminals 4, 5, 6, 8, 9 and 10 in row J of hood.

Solenoid 627—spring trip switch 602—terminal 654 on converting switch—terminal 656 on converting switch—terminal 7 on row L of hood—connecting bar 780—terminal 7 on row M of hood—line 691.

The circuit being completed between the solenoid 627 and lines 690 and 691, the solenoid 628 is actuated and switch A tripped thereby placing the device in non-operable condition.

If an eleven is thrown upon the second throw before a 4, 5, 6, 8, 9 or 10 is thrown duplicating the first throw, the following circuits are completed:

Switch A—spring trip switch 609—solenoid 675—illuminating means 678—line 690.

Switch A—terminal 657 on converting switch—terminal 658 on converting switch—terminals 4, 5, 6, 8, 9 and 10 in row J of hood—connecting bar 781—terminals 4, 5, 6, 8, 9 and 10 in row K of hood.

The circuit not being completed between lines 690 and 691 and solenoid 675, the score tallying mechanism is not operated.

The connections to the solenoid 627 are substantially as follows:

Solenoid 627—line 690.

Solenoid 627—spring trip switch 613—switch A—terminal 11 in row J of hood.

Solenoid 627—spring trip switch 613—switch A—terminal 657 on converting switch—terminal 658 on converting switch—terminals 4, 5, 6, 8, 9 and 10 on row J of hood.

Solenoid 627—spring trip switch 602—terminal 654 on converting switch—terminal 656 on converting switch—terminal 7 in row L of hood—connecting bar 780—terminal 7 in row M of hood—line 691.

The circuit being completed between the solenoid 627 and the lines 690 and 691, the solenoid 628 is actuated and the switch A tripped thereby placing the device in non-operable condition.

From the foregoing it will be perceived that when on the first throw a seven or eleven appears, the score tallying mechanism is actuated and the device put in non-operable condition; when a 4, 5, 6, 8, 9 or 10 appears on the first throw, the score tallying mechanism is not actuated and the operator is permitted to make additional throws until he duplicates his first throw, in which case the score tallying mechanism is actuated, or a seven or an eleven appears in which case the score tallying mechanism is not actuated but in both cases the device is put in non-operable condition when the throw indicated is made.

*Slide B*

When the selector slide B is pushed in the selector switch, substantially the same as that shown in Fig. 3a, is operated, moving the electrical contacts into closed position. Assuming for purposes of example that a 6 has been thrown by operation of the mechanism as hereinabove described, the following circuits will be completed:

Switch B—spring trip switch 607—solenoid 675—illuminating means 678—line 690.

Switch B—terminal 6 on row L of hood—connecting member 780—terminal 7 on row M of hood—line 691.

The circuit being completed between the lines 690 and 691 and the solenoid 675, the score tallying means is actuated so that the score tally wheel is advanced five points or one notch on the ratchet.

The solenoid 626 is placed in circuit with the lines 690 and 691 thru the following connections:

Solenoid 626—spring trip switch 612—terminal 6 on row L of hood—connecting member 780—terminal 6 on row M of hood—line 691.

Circuit being completed between the solenoid and the power carrying lines, the solenoid 629 is actuated, thereby tripping the switch B and placing the device in non-operable condition.

When a 2, 3, 4, 5, 8, 9, 10, 11 or 12 is thrown, the following circuits are completed:

Switch B—spring trip switch 607—solenoid 675—illuminating means 678—line 690.

Switch B—terminal 6 in line L of hood.

When any of these numbers are thrown the scoring mechanism is not actuated. Connections to the solenoid 626 when any of these numbers is thrown are as follows:

Solenoid 626—line 690.

Solenoid 626—spring trip switch 612—terminal 6 on row L of hood.

Solenoid 626—spring trip switch 601—terminal 7 in row L of hood.

Under these conditions the solenoid 626 is not operated inasmuch as the circuit connecting same to the lines 690 and 691 is not completed.

Assuming that a 7 is thrown the following circuits are completed:

Switch B—spring trip switch 607—solenoid 675—illuminating means 678—line 690.

Switch B—terminal 6 of line L of hood.

The circuit not being completed between the solenoid 675 and the lines 690 and 691, solenoid 675 is not operated and, accordingly, the score tallying mechanism does not function.

Solenoid 626—line 690.

Solenoid 626—spring trip switch 612—terminal 6 in row L of hood.

Solenoid 626—spring trip switch 601—terminal 7 in row L of hood—connecting bar members 780—terminal 7 in row M of hood—line 691.

Accordingly, when a 7 is thrown the score tallying mechanism is not actuated but the solenoid 626 is connected to the lines 690 and 691, thereby actuating the solenoid 629 and tripping switch B whereby the device is placed in non-operable condition.

*Slide C*

Referring now to slide C, when the selector switch slide C is pushed in and the device operated as hereinbefore described the following circuits are completed:

Switch C—terminal 8 in row L of hood—connecting bar member 780—terminal 8 in row M of hood—line 691.

Switch C—spring trip switch 606—solenoid 675—illuminating means 678—line 690.

As hereinabove indicated, when an 8 is thrown the solenoid 675 is placed in series with the line 690 and 691 thereby actuating the score tallying mechanism.

Under the foregoing conditions the solenoid 625 enters into the following circuits:

Solenoid 625—spring trip switch 601—terminal 7 in row L of hood.

Solenoid 625—line 690.

Solenoid 625—spring trip switch 611—terminal 8 of row L of hood—connecting member 780—terminal 8 of row M of hood—line 691.

Accordingly, insomuch as the solenoid 625 is connected in series with the lines 690 and 691, as above indicated, the solenoid 630 is actuated, thereby tripping the switch C and placing the device in non-operable condition.

If instead of an 8, a 2, 3, 4, 5, 6, 9, 10, 11 or 12 is thrown the following circuits are established:

Switch C—spring trip switch 606—solenoid 675—illuminating means 678—line 690.

Switch C—terminal 8 of row L of hood.

Accordingly, inasmuch as the circuit is not completed between the solenoid 675 and the lines 690 and 691, the score tallying mechanism is not actuated. Under the foregoing conditions the following circuits are completed to the solenoid 625:

Solenoid 625—line 690.

Solenoid 625—spring trip switch 601—terminal 7 of row L of hood.

Solenoid 625—spring trip switch 611—terminal 8 of row L of hood.

Inasmuch as the circuit is not completed between the solenoid 625 in the lines 690 and 691, the device is not placed in non-operable condition by tripping of switch C but instead remains in operable condition with switch C closed.

If a 7 is thrown the following circuits are completed:

Switch C—spring trip switch 606—solenoid 675—illuminating means 678—line 690.

Switch C—terminal 8 of row L of hood.

When a 7 is thrown the score tallying mechanism is not actuated inasmuch as solenoid 675 is not placed in circuit with the lines 690 and 691.

When a 7 is thrown connections are established between the solenoid 675 and the lines 690 and 691 as follows:

Solenoid 625—line 690.

Solenoid 625—spring trip switch 611—terminal 8 of row L of hood.

Solenoid 625—spring trip switch 601—terminal 7 of row L of hood—connecting member 780—terminal 7 of row M of hood—line 691.

Under these conditions the solenoid 625 is actuated, thereby operating the solenoid 630 and placing the device in non-operable condition.

*Slide D*

When selector slide D is pushed in three switch contacts arranged at the base thereof establish circuits respectively indicated as $D^1$, $D^2$ and $D^3$. When a 2, 3, 4, 9, 10, 11 or 12 is thrown the circuits completed are substantially as follows:

Switch $D^1$—spring trip switch 603—solenoid 675—illuminating means 678—line 690.

Switch $D^1$—terminals 2, 3 and 12 of row L of hood—connecting member 780—terminals 2, 3 and 12 of row M of hood—line 691.

Switch $D^2$—spring trip switch 604—solenoid 675—illuminating means 678—line 690.

Switch $D^2$—terminals 4, 9 and 10 of row L of hood—connecting member 780—terminals 4, 9 and 10 of row M of hood—line 691.

Switch $D^3$—spring trip switch 605—solenoid 675—illuminating means 678—line 690.

Switch $D^3$—terminal 11 of row L of hood—connecting member 780—terminal 11 of row M of hood—line 691.

When any of the above mentioned numbers are thrown the solenoid 675 is placed in circuit with the lines 690 and 691, thereby actuating the score tallying mechanism.

If a 5, 6, 7 or 8 is thrown the following circuits are made:

Switch $D^1$—spring trip switch 603—solenoid 675—illuminating means 678—line 690.

Switch $D^1$—terminals 2, 3, and 12 of line L of hood.

Switch $D^2$—spring trip switch 604—solenoid 675—illuminating means 678—line 690.

Switch $D^2$—terminals 4, 9 and 10 of row L of hood.

Switch $D^3$—spring trip switch 605—solenoid 675—illuminating means 678—line 690.

Switch $D^3$—terminal 11 of row L of hood.

No circuit is completed between the solenoid 675 and the lines 690 and 691, hence the score tallying mechanism is not operated.

It will be noted that switch slides D, E and F are released from their locked position by cams turning on a shaft actuated by the latch 400 which engages with the reading arm 502.

*Slide E*

When slide E is pushed in and a 2, 3 or 12 thrown the following circuits are completed:

Switch E—terminals 2, 3 and 12 of line L of the hood—connecting member 780—terminals 2, 3 and 12 of row M of the hood—line 691.

Switch E—spring trip switch 608—solenoid 677—illuminating means 680—line 690.

Accordingly, when a 2, 3 or 12 is thrown the solenoid 677 is placed in series with the lines 690 and 691, thereby actuating the score tallying mechanism and increasing the operator's score by fifteen points, which is equivalent to three notches in the ratchet wheel.

If a 4, 5, 6, 7, 8, 9, 10 or 11 is thrown the following circuits are established:

Switch E—spring trip switch 608—solenoid 677—illuminating means 680—line 690.

Switch E—terminals 2, 3, and 12 of row L of hood.

Accordingly, when a 4, 5, 6, 7, 8, 9, 10 or 11 is thrown, the score tallying mechanism is not actuated.

*Slide F*

When selector slide F is pushed in, thereby closing switch F, and an 11 is thrown, the following circuits are completed:

Switch F—spring trip switch 600—solenoid 676—illuminating means 679—line 690.

Switch F—terminal 11 in row L of hood—connecting member 780—terminal 11 in row M of hood—line 691.

As above indicated, the score tallying solenoid 676 is placed in circuit with the lines 690 and 691 when a 7 is thrown, thereby moving the display wheels five notches in the ratchet or an equivalent of twenty-five points.

If instead of an 11 the operator throws a 2, 3, 4, 5, 6, 7, 8, 9, 10 or 12, the solenoid 676 is not placed in series with the lines 690 and 691, the circuits being substantially as follows:

Switch F—spring trip switch 600—solenoid 676—illuminating means 679—line 690.

Switch F—terminal 11 of line L of hood.

When the selector slides D, E, and F are being used the device is put in a non-operable condition at the conclusion of the first throw by the switch 500 attached to the reading head which opens when the head is raised as the result of tripping of the latch 400 by the reading arm 502.

It is to be understood that the present invention is capable of extended application and is not confined to the exact showing of the drawings nor to the precise construction described and, therefore, such changes and modifications may be made therein as do not affect the spirit of the invention nor exceed the scope thereof as expressed in the appended claims.

What is claimed as new is:

1. In a device of the character described, a plurality of dies bearing indicia, said indicia comprising localized depressions in an otherwise substantially plane surface, manually operated means for imparting movement of a uniform predetermined character to said dies, means operating in conjunction with the aforementioned moving means for receiving and positioning said dies in a predetermined manner, translating means comprising a plurality of pins corresponding in number to the largest total number of indicia exposable upon the surfaces of said dies disposed in one plane and arranged in predetermined design having relation to the arrangement of said indicia on said surfaces, said pins being engageable with the aforementioned localized depressions in said die surfaces, electrical contact establishing and electrical contact-breaking means functioning in conjunction with said pins whereby a plurality of electrical circuits will be altered in a predetermined manner, the total number of circuits so altered being directly proportional to the total number of indicia engaged with the translating means, means cooperating with said translating means for integrating said altered electrical circuits, whereby another electrical circuit is altered in a predetermined manner a plurality of times equal in number to the total number of unintegrated circuits originally altered, and means operated by said integrating circuit for visibly displaying the numerical sum of the indicia engaged with said translating means.

2. In a device of the character described, a plurality of dies bearing indicia, said indicia comprising localized depressions in an otherwise substantially plane surface, manually operated means for imparting movement of a uniform predetermined character to said dies, said means comprising a receptacle for the dies held in a locked position under spring tension by a latch, means for releasing said latch whereby the container holding the dies is moved by the spring tension means in a predetermined manner and the dies ejected from said container, means functioning in conjunction with the aforementioned means for moving the dies for receiving said dies comprising a hopper having sloping sides, manually operated means for sweeping the lower surface of said hopper whereby the dies are moved into a predetermined position, translating means comprising a plurality of pins corresponding in number to the largest total number of indicia exposable upon the surfaces of said dies disposed in one plane and arranged in predetermined design having relation to the arrangement of said indicia on said surfaces, said pins being engageable with the aforementioned localized depressions in said die surfaces, electrical contact-establishing and electrical contact-breaking means functioning in conjunction with said pins whereby a plurality of electrical circuits will be altered in a predetermined manner, the total number of circuits so altered being directly proportional to the total number of indicia engaged with the translating means, means cooperating with said translating means for integrating said altered electrical circuits, whereby another electrical circuit is altered in a predetermined manner a plurality of times equal in number to the total number of unintegrated circuits originally altered, and means operated by said integrating circuit for visibly displaying the numerical sum of the indicia engaged with said translating means.

3. In a device of the character described, a plurality of dies bearing indicia, said indicia comprising localized depressions in an otherwise substantially plane surface, manually operated means for imparting movement of a uniform predetermined character to said dies, means operating in conjunction with the aforementioned moving means for receiving and positioning said dies in a predetermined manner, translating means comprising a plurality of pins corresponding in number to the largest total number of indicia exposable upon the surfaces of said dies disposed in one plane and arranged in predetermined design having relation to the arrangement of said indicia on said surfaces, said pins being engageable with the aforementioned localized depressions in said die surfaces, electrical contact-establishing and electrical contact-breaking means functioning in conjunction with said pins whereby a plurality of electrical circuits will be altered in a predetermined manner, the total number of circuits so altered being directly proportional to the total number of indicia engaged with the translating means, means cooperating with said translating means for integrating said altered electrical circuits, whereby another electrical circuit is altered in a predetermined manner a plurality of times equal in number to the total number of unintegrated circuits originally altered, said integrating means comprising an electrical circuit including in series connection a solenoid, a power source, a moving arm traveling over a plurality of contact points and circuit-forming and circuit-breaking means connected between said contact points and said power source functioning in conjunction with the aforementioned translating means whereby the solenoid is actuated a plurality of times having relation to the total number of indicia exposed upon the surfaces of the dies disposed in one plane, and means operated by said integrating circuit for visibly displaying the numerical sum of the indicia engaged with said translating means.

4. In a device of the character described, a plurality of dies bearing indicia, said indicia comprising localized depressions in an otherwise substantially plane surface, manually operated means for imparting movement of a uniform predetermined character to said dies, said means comprising a receptacle for the dies held in a locked position under spring tension by a latch.

means for releasing said latch whereby the container holding the dies is moved by the spring tension means in a predetermined manner and the dies ejected from said container, means functioning in conjunction with the aforementioned means for moving the dies for receiving said dies comprising a hopper having sloping sides, manually operated means for sweeping the lower surface of said hopper whereby the dies are moved into a predetermined position, translating means comprising a plurality of pins corresponding in number to the largest total number of indicia exposable upon the surfaces of said dies disposed in one plane and arranged in predetermined design having relation to the arrangement of said indicia on said surfaces, said pins being engageable with the aforementioned localized depressions in said die surfaces, electrical contact-establishing and electrical contact-breaking means functioning in conjunction with said pins whereby a plurality of electrical circuits will be altered in a predetermined manner, the total number of circuits so altered being directly proportional to the total number of indicia engaged with the translating means, means cooperating with said translating means for integrating said altered electrical circuits, whereby another electrical circuit is altered in a predetermined manner a plurality of times equal in number to the total number of unintegrated circuits originally altered, said integrating means comprising an electrical circuit including in series connection a solenoid, a power source, a moving arm traveling over a plurality of contact points and circuit-forming and circuit-breaking means connected between said contact points and said power source functioning in conjunction with the aforementioned translating means whereby the solenoid is actuated a plurality of times having relation to the total number of indicia exposed upon the surfaces of the dies disposed in one plane, means operable by said solenoid for visibly displaying the numerical sum of indicia engaged with said translating means, means operable in conjunction with said display means for visibly displaying matter having a predetermined relationship to the particular sum of the indicia displayed as aforementioned.

5. In a device of the character described, a plurality of dies bearing indicia, said indicia comprising localized depressions in an otherwise substantially plane surface, means whereby the operator may register his prognostication of the total number of indicia which will appear upon the surfaces of the dies disposed in one plane upon subsequent operation of the device, manually operated means for imparting movement of a uniform predetermined character to said dies, means operating in conjunction with the aforementioned moving means for receiving and positioning said dies in a predetermined manner, translating means comprising a plurality of pins corresponding in number to the largest total number of indicia exposable upon the surfaces of said dies disposed in one plane and arranged in predetermined design having relation to the arrangement of said indicia on said surfaces, said pins being engageable with the aforementioned localized depressions in said die surfaces, electrical contact-establishing and electrical contact-breaking means functioning in conjunction with said pins whereby a plurality of electrical circuits will be altered in a predetermined manner, the total number of circuits so altered being directly proportional to the total number of indicia engaged with the translating means, means cooperating with said translating means for integrating said altered electrical circuits, whereby another electrical circuit is altered in a predetermined manner a plurality of times equal in number to the total number of unintegrated circuits originally altered, said integrating means comprising an electrical circuit including in series connection a solenoid, a power source, a moving arm traveling over a plurality of contact points and circuit-forming and circuit-breaking means connected between said contact points and said power source functioning in conjunction with the aforementioned translating means whereby the solenoid is actuated a plurality of times having relation to the total number of indicia exposed upon the surfaces of the dies disposed in one plane, means at least partially operated by said solenoid and its cooperating members whereby the total number of indicia actually appearing upon the surfaces of the dies disposed in one plane can be compared with operator's registered prognostication of same, and means actuated by said comparing means for visibly displaying analogy between the prognostication and the number actually appearing during operation of the device.

6. In a device of the character described, a plurality of dies bearing indicia, said indicia comprising localized depressions in an otherwise substantially plane surface, means whereby the operator may register his prognostication of the total number of indicia which will appear upon the surfaces of the dies disposed in one plane upon subsequent operation of the device, manually operated means for imparting movement of a uniform predetermined character to said dies, means operating in conjunction with the aforementioned moving means for receiving and positioning said dies in a predetermined manner, translating means comprising a plurality of pins corresponding in number to the largest total number of indicia exposable upon the surfaces of said dies disposed in one plane and arranged in predetermined design having relation to the arrangement of said indicia on said surfaces, said pins being engageable with the aforementioned localized depressions in said die surfaces, electrical contact-establishing and electrical contact-breaking means functioning in conjunction with said pins whereby a plurality of electrical circuits will be altered in a predetermined manner, the total number of circuits so altered being directly proportional to the total number of indicia engaged with the translating means, means cooperating with said translating means for integrating said altered electrical circuits, whereby another electrical circuit is altered in a predetermined manner a plurality of times equal in number to the total number of unintegrated circuits originally altered, said integrating means comprising an electrical circuit including in series connection a solenoid, a power source, a moving arm traveling over a plurality of contact points and circuit-forming and circuit-breaking means connected between said contact points and said power source functioning in conjunction with the aforementioned translating means whereby the solenoid is actuated a plurality of times having relation to the total number of indicia exposed upon the surfaces of the dies disposed in one plane, means at least partially operated by said solenoid and its cooperating members whereby the total number of indicia actually appearing upon the surfaces of the dies disposed in one plane can be compared with operator's registered prognostication of same, means actuated by said comparing means for visibly displaying analogy between the prognostication and the number actually appearing during operation of the device, and means for returning the operated members of the system to their initial position.

7. In a device of the character described, means for imparting movement to a plurality of dies comprising an open receptacle for said dies rotatably mounted on pivots, attached to resilient tensioning means and engageable with a latch member, whereby the pivoted receptacle is caused to move about its axis by the tensioning means upon the release of said latch thereby ejecting the dies therefrom.

8. In a device of the character described, means for altering in a predetermined manner a plurality of electrical circuits, means cooperating therewith for integrating said altered electrical circuits whereby another electrical circuit is altered in a predetermined manner a plurality of times equal in number to the total number of unintegrated circuits originally altered, said integrating means including an electrical circuit comprising a solenoid in series with a power source and a moving arm traveling over a plurality of contact points, said contact points being connected thru aforementioned unintegrated originally altered circuits to said power source, whereby the solenoid is connected in series with the power source when the unintegrated circuits have been altered in a predetermined manner.

9. In a device of the character described, indicia-bearing dies, translating means for mechanically reading certain indicia exposed on said dies, a plurality of switches operable by said translating means for altering a plurality of electrical circuits a number of times having relation to the exposed indicia, means for electrically integrating the altered circuits, and means associated with said integrating means for visibly displaying matter having a predetermined relationship to the indicia read.

10. In a device of the character described, indicia-bearing dies, translating means for mechanically reading certain indicia exposed on said dies, a plurality of switches operable by said translating means for altering a plurality of electrical circuits a number of times having relation to the exposed indicia, means for electrically integrating the altered circuits, means associated with said integrating means for visibly displaying matter having a predetermined relationship to the indicia read, and means functioning in conjunction with said display means for retaining said display during subsequent operations of the device and comparing the display of the first operation with subsequent displays.

11. In a device of the character described, indicia-bearing dies, translating means for mechanically reading certain indicia exposed on said dies, electrical contact establishing and electrical contact breaking means functioning in conjunction with said translating means whereby a plurality of electrical circuits are altered in a predetermined manner, the total number of circuits so altered being directly proportional to the total number of indicia read, means cooperating with said translating means for integrating said altered electrical circuits whereby another electrical circuit is altered in a predetermined manner a plurality of times equal in number to the total number of unintegrated circuits originally altered, said integrating means comprising an electrical circuit including in series connection a solenoid, a power source, a moving arm traveling over a plurality of contact points and circuit-forming and circuit-breaking means connected between said contact points and said power source functioning in conjunction with the aforementioned translating means whereby the solenoid is actuated a plurality of times having relation to the total number of read indicia, means operable by said solenoid for visibly displaying the numerical sum of read indicia, and means for holding said displayed sum for comparison with sums subsequently displayed during further operation of the device.

12. In a device of the character described, means for altering in a predetermined manner a plurality of electrical circuits, means cooperating therewith for integrating said altered electrical circuits whereby another electrical circuit is altered in a predetermined manner a plurality of times equal in number to the total number of unintegrated circuits originally altered, said integrating means including an electrical circuit comprising a solenoid in series with a power source and a moving arm traveling over a plurality of contact points, said contact points being connected through the aforementioned unintegrated originally altered circuits to said power source, whereby the solenoid is connected in series with the power source when the unintegrated circuits have been altered in a predetermined manner, means for visibly displaying the integration result, means for holding said integration result during subsequent operations of the device, and means for comparing said first result with subsequent results.

13. In a device of the type described, means for altering in a predetermined manner a plurality of electrical circuits, means cooperating therewith for integrating said altered electrical circuits whereby another electrical circuit is altered in a predetermined manner a plurality of times equal in number to the total number of unintegrated circuits originally altered, said integrating means including an electrical circuit comprising a solenoid in series with a power source and a moving arm traveling over a plurality of contact points, said contact points being connected through the aforementioned unintegrated originally altered circuits to said power source whereby the solenoid is connected in series with the power source when the unintegrated circuits have been altered in a predetermined manner, means for visibly displaying the integration result including a plurality of wheels rotatable by said solenoid, means for retaining the integration result during subsequent operations of the device, said holding means including electrical switches actuated by initial movement of said wheels operable by said solenoid, and means for comparing said initial result with subsequent integration results.

14. In a device of the type described, a plurality of indicia-bearing dies, means for positioning said dies in a predetermined locality whereby indicia on certain portions of said dies are visibly displayed, means for mechanically reading displayed indicia on said dies, means for integrating read indicia to give an integration product, means for thereafter removing said dies from the reading mechanism and returning same to place for subsequent use, and means for altering an electrical circuit in a predetermined manner a predetermined number of times equal in number to the numerical value of the integration product.

15. In a device of the type described, a plurality of indicia-bearing dies, means for imparting movement to said dies comprising a movable first receptacle therefor normally held under tension by engagement with a latch, means for periodically disengaging said latch whereby said dies are ejected from said first receptacle, a second receptacle for receiving the discharged dies, mechanism for reading indicia on said dies while in said second receptacle, means for engaging said mechanism with said dies, and automatically operating means for returning said dies to said first receptacle after reading.

16. In a device of the type described, a plurality of indicia-bearing dies, means for imparting movement to said dies comprising a movable first receptacle therefor normally held under tension by engagement with a latch, means for periodically disengaging said latch whereby said dies are ejected from said first receptacle, a second receptacle for receiving the discharged dies, means cooperating with portions of said second receptacle for moving said dies to a localized portion thereof, mechanism for reading indicia on said dies, means for engaging said mechanism with said dies when positioned in said locality of said second receptacle, and automatically operating means for returning said dies to said first receptacle after reading.

17. In a device of the type described, a plurality of dies, indicia on said dies comprising localized depressions therein, means for imparting movement to said dies comprising a movable first receptacle therefor normally held under tension by engagement with a latch, means for periodically disengaging said latch whereby said tension is released and said dies are ejected from said first receptacle, a second receptacle for receiving the discharged dies, means cooperating with portions of said second receptacle for moving said dies to a localized portion thereof, mechanism for reading indicia on said dies, said mechanism comprising a plurality of pins, corresponding in number to the largest total number of indicia to be read, said pins being engageable with the indicia on said dies, electrical switching means functioning in conjunction with said pins whereby a plurality of electrical circuits are altered in a predetermined manner, the total number of altered circuits being directly proportional to the total number of read indicia, and automatically operating means for returning said dies to said first receptacle after reading.

18. In a device of the type described, a plurality of dies, indicia on said dies comprising localized depressions therein, means for imparting movement to said dies comprising a movable first receptacle therefor normally held under tension by engagement with a latch, means for periodically disengaging said latch whereby said tension is released and said dies are ejected from said first receptacle, a second receptacle for receiving the discharged dies, means cooperating with portions of said second receptacle for moving said dies to a localized portion thereof, mechanism for reading indicia on said dies, said mechanism comprising a plurality of pins, corresponding in number to the largest total number of indicia to be read, said pins being engageable with the indicia on said dies, electrical switching means functioning in conjunction with said pins whereby a plurality of electrical circuits are altered in a predetermined manner, the total number of altered circuits being directly proportional to the total number of read indicia, automatically operating means for returning said dies to said first receptacle after reading, integrating means comprising electrical circuits associated with said reading means whereby an electrical circuit is altered a number of times numerically equal to the number of indicia read, and means associated with said integrating means for visibly displaying the integration product.

19. In a device of the type described, a plurality of dies, indicia on said dies comprising localized depressions therein, means for imparting movement to said dies comprising a movable first receptacle therefor normally held under tension by engagement with a latch, means for periodically disengaging said latch whereby said tension is released and said dies are ejected from said first receptacle, a second receptacle for receiving the discharged dies, means cooperating with portions of said second receptacle for moving said dies to a localized portion thereof, mechanism for reading indicia on said dies, said mechanism comprising a plurality of pins, corresponding in number to the largest total number of indicia to be read, said pins being engageable with the indicia on said dies, electrical switching means functioning in conjunction with said pins whereby a plurality of electrical circuits are altered in a predetermined manner, the total number of altered circuits being directly proportional to the total number of read indicia, automatically operating means for returning said dies to said first receptacle after reading, integrating means comprising electrical circuits associated with said reading means whereby an electrical circuit is altered a number of times numerically equal to the number of indicia read, means associated with said integrating means for visibly displaying the integration product, and means including electrical circuits for retaining said integration product and comparing same with integration products resultant during subsequent operations of the device.

20. In a device of the type described, indicia-bearing dies, translating means for mechanically reading certain indicia exposed on said dies, a plurality of switches operable by said translating means for altering a plurality of electrical circuits, the number of said circuits altered having relation to the number of indicia, means for electrically integrating said altered circuits, said integrating means comprising an electrical circuit including in series connection a solenoid, a power source, a moving arm traveling over a plurality of contact points and switching means connected between said contact points and said power source functioning in conjunction with the aforementioned translating means whereby the solenoid is actuated a plurality of times having direct relationship to the total number of indicia translated, means for prognosticating the number of indicia to be translated, means including electrical switches operated by said moving arm for comparing the integration product comprising the actual number of translated indicia with the prognosticated number of indicia to be translated, and means operable by said solenoid for visibly displaying the numerical sum of indicia engaged with said translating means.

21. In a device of the character described, a plurality of dies bearing indicia, said indicia comprising localized depressions in an otherwise substantially plane surface, manually operated means for imparting movement of a uniform predetermined character to said dies, said means comprising a receptacle for the dies held in a locked position under spring tension by a latch, means for releasing said latch whereby the container holding the dies is moved by the spring tension means in a predetermined manner and the dies ejected from said container, means functioning in conjunction with the aforementioned means for moving the dies for receiving said dies comprising a hopper having sloping sides, manually operated means for sweeping the lower surface of said hopper whereby the dies are moved into a predetermined position, translating means comprising a plurality of pins corresponding in number to the largest total number of indicia exposable upon the surfaces of said dies disposed in one plane and arranged in predetermined design having relation to the arrangement of said indicia on said surfaces, said pins being engageable with the aforementioned localized depressions in said die surfaces, electrical contact-establishing and electrical contact-breaking means functioning in conjunction with said pins whereby a plurality of electrical circuits will be altered in a predetermined manner, the total number of circuits so altered being directly proportional to the total number of indicia engaged with the translating means, means cooperating with said translating means for integrating said altered electrical circuits, whereby another electrical circuit is altered in a predetermined manner a plurality of times equal in number to the total number of unintegrated circuits originally altered, said integrating means comprising an electrical circuit including in series connection a solenoid, a power source, a moving arm traveling over a plurality of contact points and switching means connected between said contact points and said power source functioning in conjunction with the aforementioned translating means whereby the solenoid is actuated a plurality of times having direct relationship to the total number of indicia translated, means for prognosticating the number of indicia to be translated, means including electrical switches operated by said moving arm for comparing the integration product comprising the actual number of translated indicia with the prognosticated number of indicia to be translated, and means operable by said solenoid for visibly displaying the numerical sum of indicia engaged with said translating means.

22. In a device of the type described, a plurality of dies, indicia on said dies comprising localized depressions therein, means for imparting movement to said dies comprising a movable first receptacle therefor normally held under tension by engagement with a latch, means for periodically disengaging said latch whereby said tension is released and said dies are ejected from said first receptacle, a second receptacle for receiving the discharged dies, means cooperating with portions of said second receptacle for moving said dies to a localized portion thereof, mechanism for reading indicia on said dies, said mechanism comprising a plurality of pins, corresponding in number to the largest total number of indicia to be read, said pins being engageable with the indicia on said dies, electrical switching means functioning in conjunction with said pins whereby a plurality of electrical circuits are altered in a predetermined manner, the total number of altered circuits being directly proportional to the total number of read indicia, automatically operating means for returning said dies to said first receptacle after reading, integrating means comprising electrical circuits associated with said reading means whereby an electrical circuit is altered a number of times numerically equal to the number of indicia read, said integrating means comprising an electrical circuit including in series connection a solenoid, a power source, a moving arm traveling over a plurality of contact points and circuit-forming and circuit-breaking means connected between said contact points and said power source functioning in conjunction with the aforementioned translating means whereby the solenoid is actuated a plurality of times having relation to the total number of read indicia, means including electrical circuits for establishing a prognostication of an integration product, means including electrical circuits comprising electrical switches operable by said moving arm for comparing the prognostication with the integration product of read indicia, and means for visibly displaying matter having a predetermined relationship to the particular sum of indicia read.

CLEMENT G. LAMICA.